US010723265B2

(12) United States Patent
Yamaguchi et al.

(10) Patent No.: US 10,723,265 B2
(45) Date of Patent: Jul. 28, 2020

(54) IMAGING DISPLAY SYSTEM

(71) Applicant: Japan Display Inc., Tokyo (JP)

(72) Inventors: Kazunori Yamaguchi, Tokyo (JP); Tsutomu Harada, Tokyo (JP); Akira Sakaigawa, Tokyo (JP); Fumitaka Gotoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 325 days.

(21) Appl. No.: 15/819,192

(22) Filed: Nov. 21, 2017

(65) Prior Publication Data
US 2018/0086266 A1    Mar. 29, 2018

Related U.S. Application Data

(63) Continuation of application No. PCT/JP2016/065830, filed on May 27, 2016.

(30) Foreign Application Priority Data

May 28, 2015  (JP) ................................ 2015-109024

(51) Int. Cl.
*B60R 1/00* (2006.01)
*H04N 5/232* (2006.01)
(Continued)

(52) U.S. Cl.
CPC ............. *B60R 1/00* (2013.01); *G09G 3/2092* (2013.01); *G09G 5/395* (2013.01);
(Continued)

(58) Field of Classification Search
None
See application file for complete search history.

(56) References Cited

U.S. PATENT DOCUMENTS

2006/0033966 A1   2/2006  Yamamoto et al.
2008/0231703 A1*  9/2008  Nagata ................... H04N 7/181
                                                        348/148
2013/0314546 A1* 11/2013  De Groot ........... H04N 5/23293
                                                        348/164

FOREIGN PATENT DOCUMENTS

JP    2000-242896 A    9/2000
JP    2001-114048 A    4/2001
(Continued)

OTHER PUBLICATIONS

International Search Report; Application No. PCT/JP2016/065830; Filing Date: May 27, 2016.

*Primary Examiner* — James M Anderson, II
(74) *Attorney, Agent, or Firm* — Michael Best & Friedrich LLP

(57) ABSTRACT

According to an aspect, an imaging display system includes an imaging device, a display device, and a processing device. The imaging device includes a rolling shutter image sensor that takes an image. The display device displays the image. The processing device performs image processing on the image. The imaging display system is mounted on a movable body that moves in a certain direction on a reference plane. The imaging device is arranged at an angle with respect to a moving direction of the movable body on the reference plane. An imaging scanning direction of the image on the image sensor is horizontal with respect to the reference plane. A display scanning direction of the image displayed on the display device coincides with the imaging scanning direction.

15 Claims, 34 Drawing Sheets

(51) Int. Cl.
*G09G 5/395* (2006.01)
*H04N 5/235* (2006.01)
*H04N 5/225* (2006.01)
*G09G 3/20* (2006.01)
*H04N 5/353* (2011.01)
*H04N 5/378* (2011.01)
*H04N 7/18* (2006.01)

(52) U.S. Cl.
CPC ......... *H04N 5/2258* (2013.01); *H04N 5/2353* (2013.01); *H04N 5/23238* (2013.01); *H04N 5/3532* (2013.01); *H04N 5/378* (2013.01); *H04N 7/185* (2013.01); *B60R 2300/30* (2013.01); *B60R 2300/303* (2013.01); *G09G 2340/10* (2013.01); *G09G 2380/10* (2013.01); *H04N 7/18* (2013.01)

(56) References Cited

FOREIGN PATENT DOCUMENTS

| JP | 2001114048 A | * | 4/2001 |
| JP | 2006-54788 A | | 2/2006 |
| JP | 2007-020045 A | | 1/2007 |
| JP | 2008-157880 A | | 10/2008 |
| JP | 2008-230558 A | | 10/2008 |
| JP | 2011-205215 A | | 10/2011 |
| JP | 2014-511606 A | | 5/2014 |
| JP | 2016-225849 A | | 12/2016 |

* cited by examiner

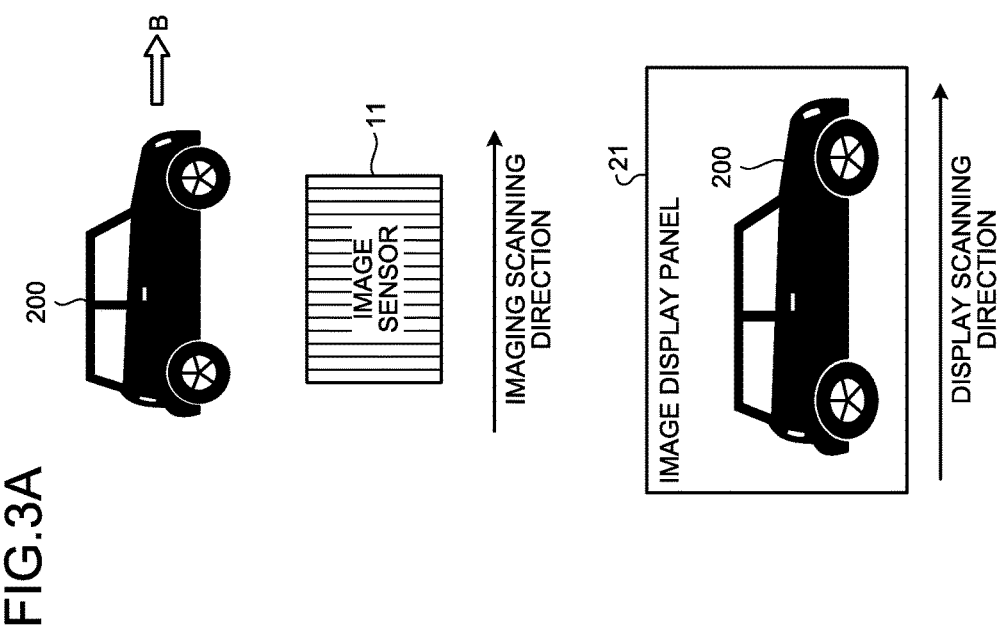
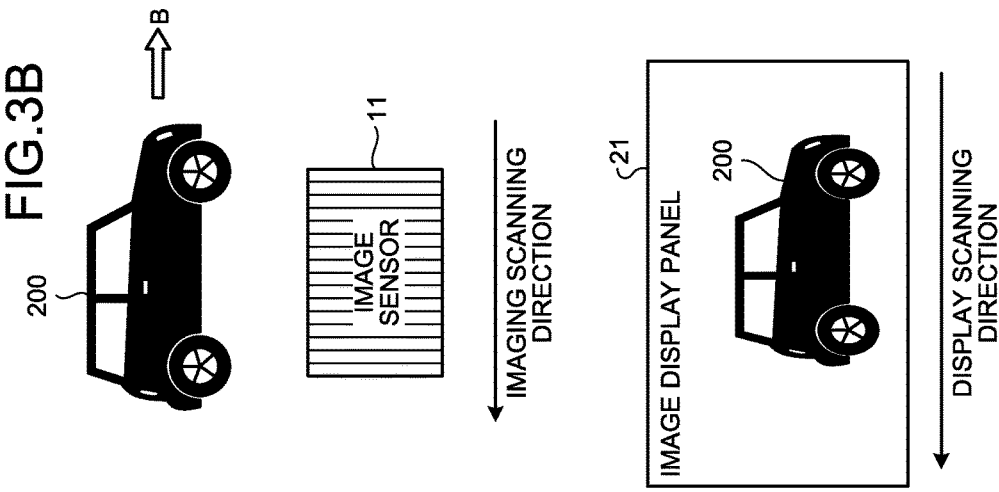

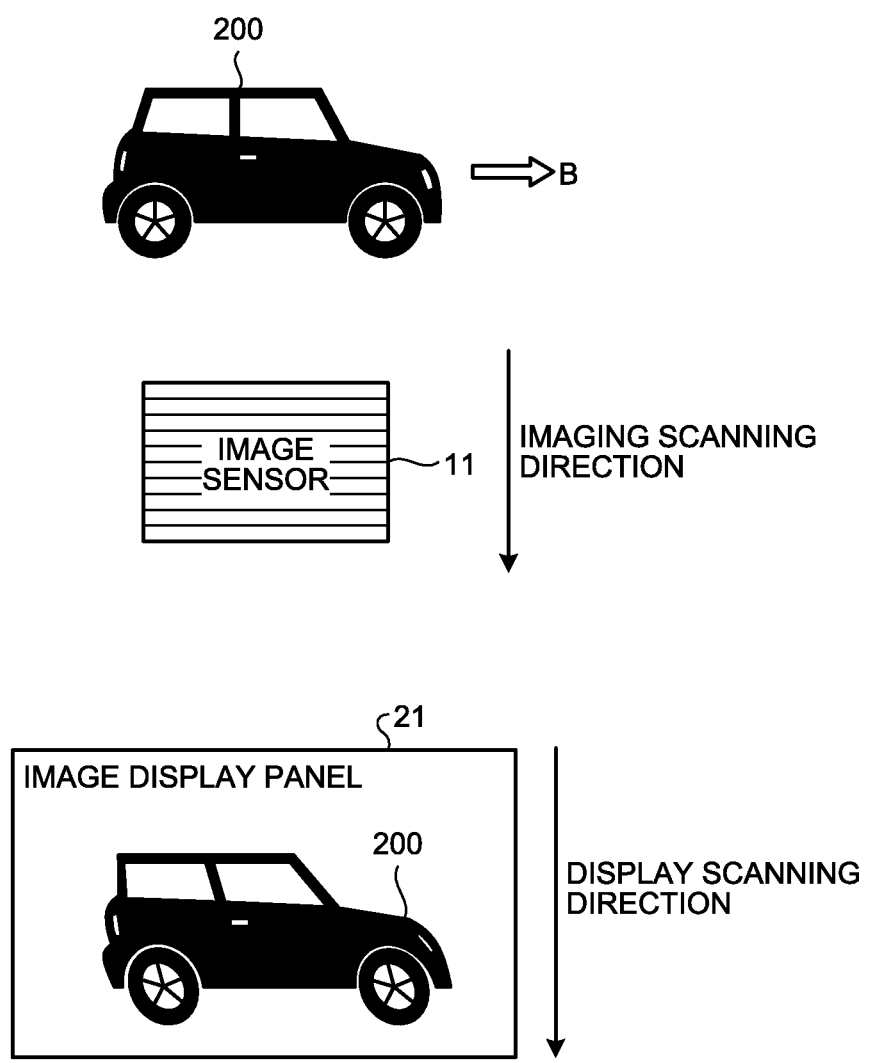

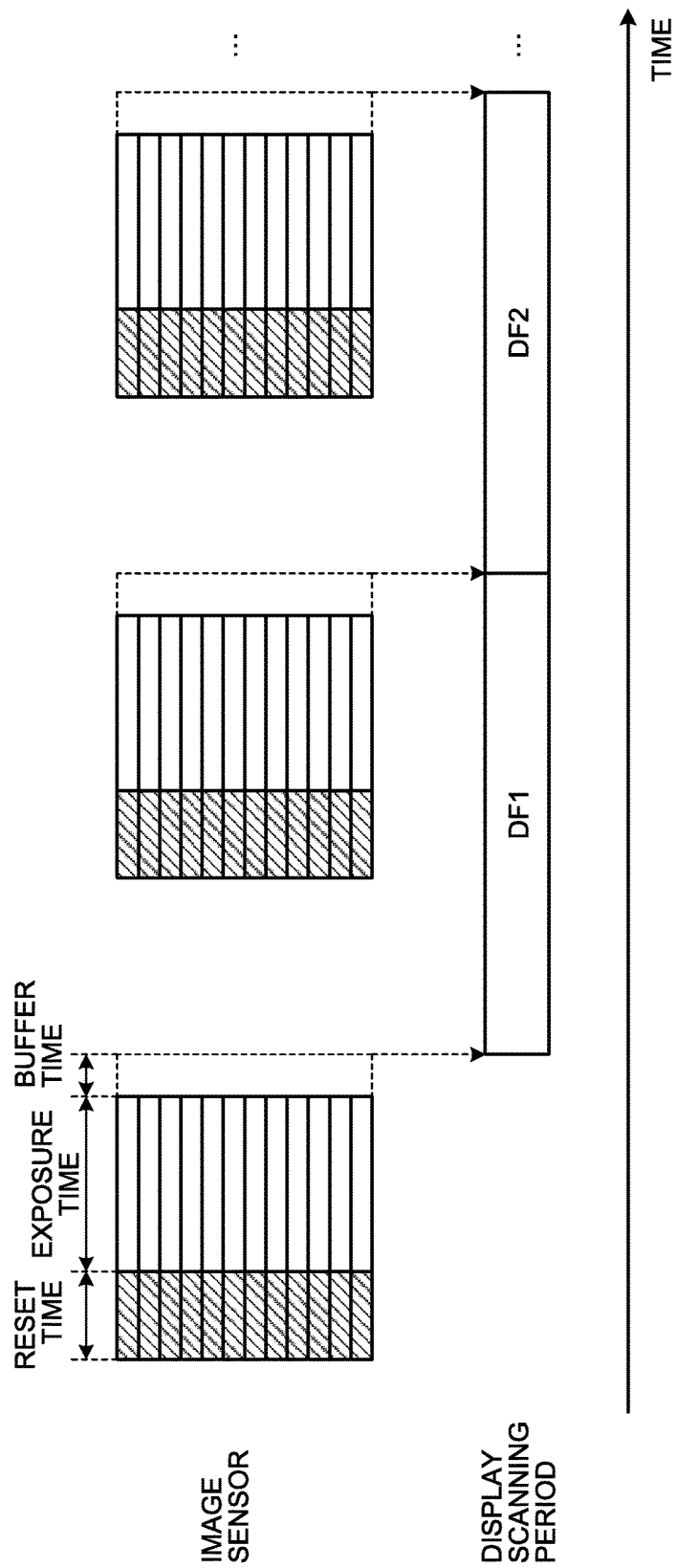

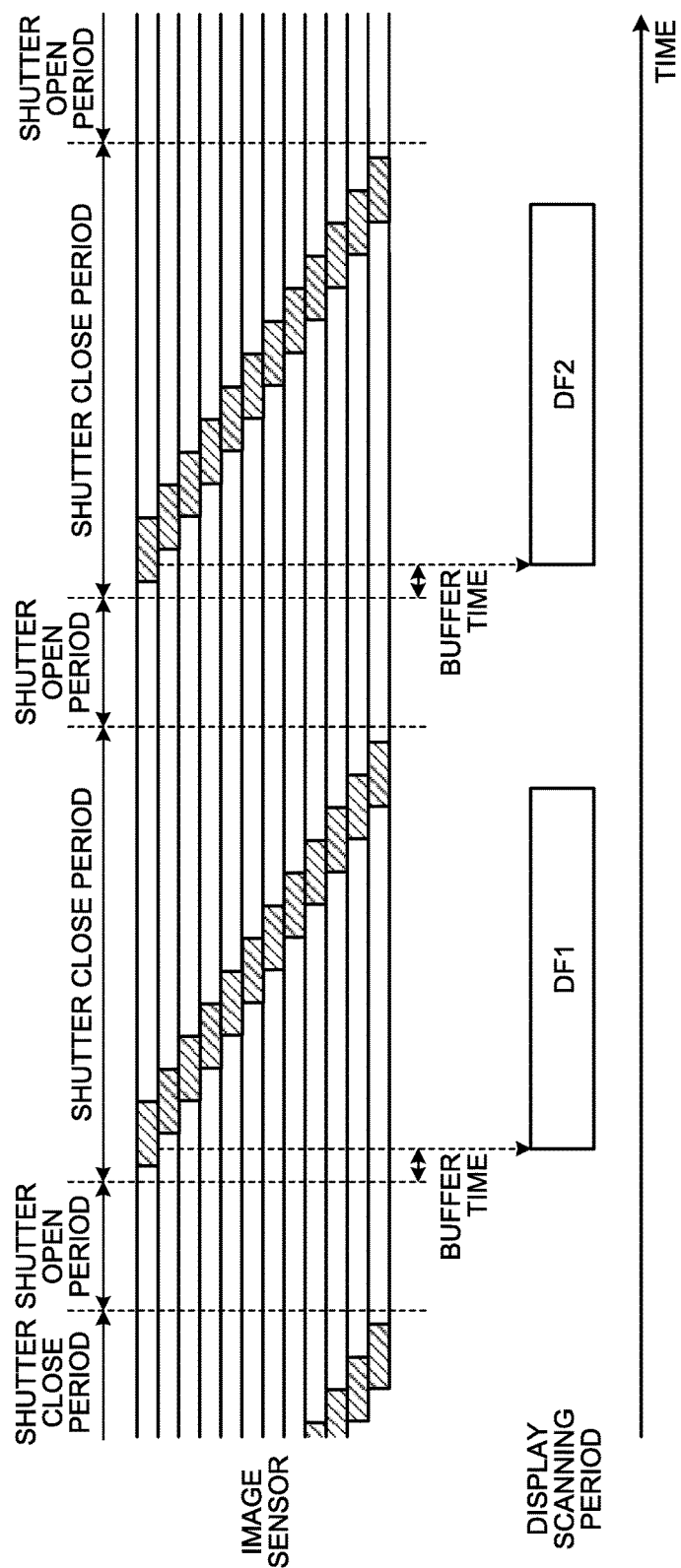

IMAGING DISPLAY SYSTEM

CROSS-REFERENCE TO RELATED APPLICATION

This application is a continuation of International Application No. PCT/JP2016/065830, filed on May 27, 2016 which claims the benefit of priority of the prior Japanese Patent Application No. 2015-109024, filed on May 28, 2015, the entire contents of which are incorporated herein by reference.

BACKGROUND

1. Technical Field

The present invention relates to an imaging display system.

2. Description of the Related Art

A typical imaging device, such as a digital camera, frequently includes a rolling shutter image sensor serving as a complementary metal oxide semiconductor (CMOS) image sensor having a line sequential scanning system. Such a rolling shutter image sensor causes image distortion (hereinafter, also referred to as moving body distortion) in capturing a moving body moving within the angle of view of the image sensor because there is a time lag in exposure start time of each line. Especially in an imaging display system that synchronizes a scanning direction of an image sensor with scanning of a display device to perform display, an image of the moving body displayed on the display device is obliquely distorted if the scanning direction of the image sensor does not coincide with the moving direction of the moving body. To install a camera on a body of a car and implement a digital mirror function that displays an image outside the car on an on-board display device to assist driving of a driver, for example, the driver may possibly erroneously recognize the distance to a car moving parallel thereto or a car moving on the opposite lane.

By contrast, a global shutter image sensor having a batch exposure system, such as a charge coupled device (CCD) image sensor, causes no moving body distortion occurring in the rolling shutter image sensor. Even in a case where a CMOS image sensor having a line sequential scanning system is used, the use of a mechanical shutter enables the CMOS image sensor to serve as a global shutter image sensor, such as a CCD image sensor. This mechanism, however, complicates the control, increases the number of parts, and causes the device to be larger because of the increase in the number of parts. In addition, this mechanism fails to cause the display frame rate in display of the image on the display device to be equal to or higher than a repetition frequency between a shutter close period and a shutter open period (batch exposure time). Japanese Patent Application Laid-open Publication No. 2008-157880 (JP-A-2008-157880), for example, describes an on-board camera device including a CMOS image sensor that implements a global shutter function without using any mechanical shutter.

The CMOS image sensor described in JP-A-2008-157880, however, requires a circuit that implements the global shutter function in the image sensor, thereby complicating circuits included in the image sensor. This configuration causes the area of a photodiode to be smaller and reduces the aperture ratio. As a result, the CMOS image sensor has a lower sensitivity and a narrower dynamic range than a CMOS image sensor having no global shutter function.

For the foregoing reasons, there is a need for an imaging display system that can eliminate or reduce erroneous recognition of a visible distance caused by moving body distortion in an image displayed on a display device without complicating a circuit in an image sensor.

SUMMARY

An imaging display system according to an aspect of the present invention includes an imaging device, a display device, and a processing device. The imaging device includes a rolling shutter image sensor that takes an image. The display device displays the image. The processing device performs image processing on the image. The imaging display system is mounted on a movable body that moves in a certain direction on a reference plane. The imaging device is arranged at an angle with respect to a moving direction of the movable body on the reference plane. An imaging scanning direction of the image on the image sensor is horizontal with respect to the reference plane, and a display scanning direction of the image displayed on the display device coincides with the imaging scanning direction.

BRIEF DESCRIPTION OF THE DRAWINGS

FIGS. 3A and 3B are diagrams each illustrating an example of a display image displayed by the imaging display system according to the first embodiment;

FIG. 4 is a diagram illustrating a display image of a comparative example compared to the imaging display system according to the first embodiment;

FIG. 6 is a diagram illustrating an example of a timing chart of the display scanning periods of a comparative example that uses a global shutter image sensor having a batch exposure system;

FIG. 7 is a diagram illustrating an example of a timing chart of the display scanning periods of another comparative example that provides a global shutter by using a mechanical shutter in combination with an image sensor having a line sequential scanning system;

DETAILED DESCRIPTION

Figure 1:
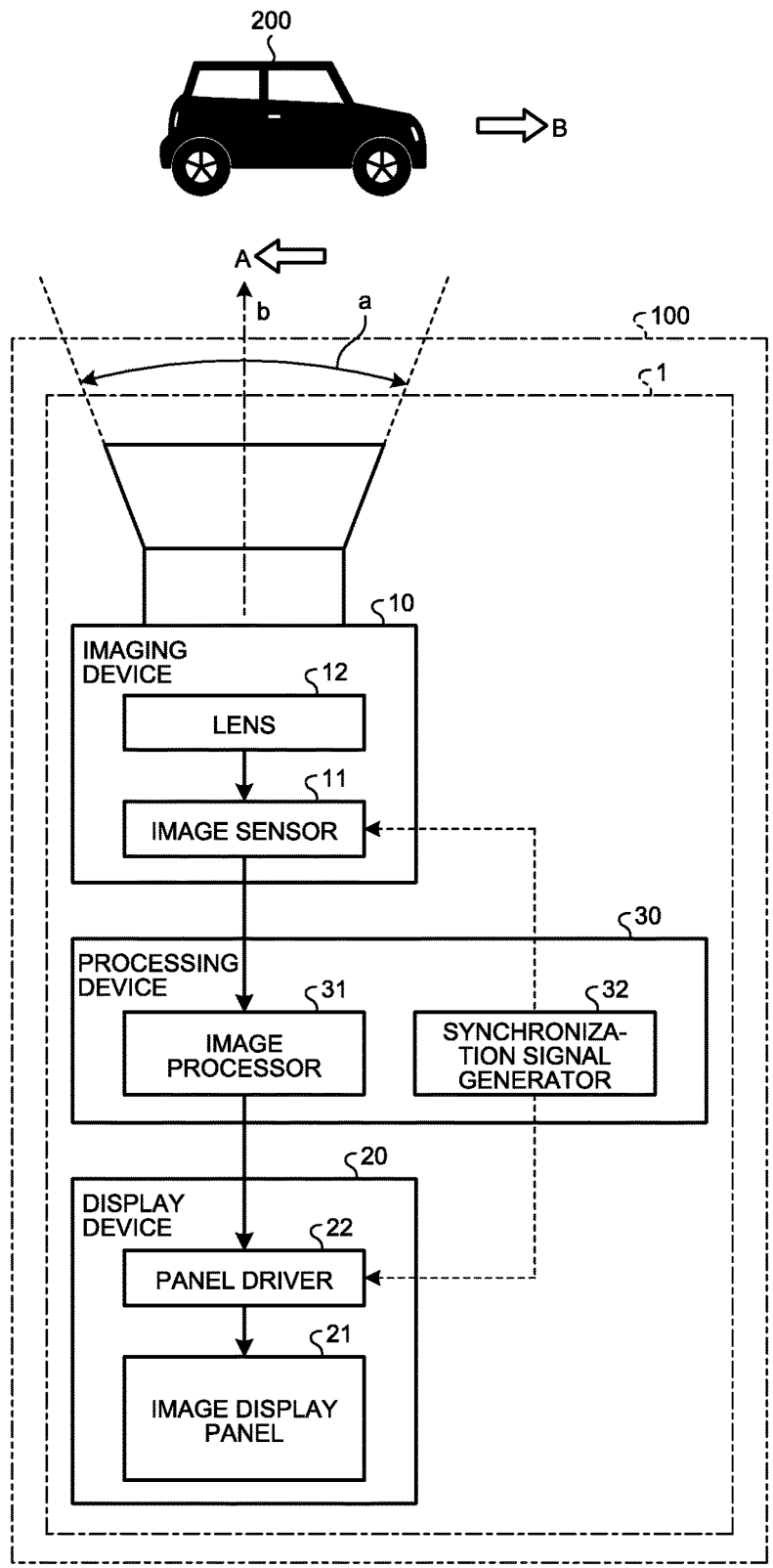
FIG. 1 is a block diagram of an exemplary schematic configuration of an imaging display system according to a first embodiment of the present invention.

Exemplary embodiments to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the figures, components similar to those previously described with reference to preceding figures are denoted by the same reference numerals, and overlapping explanation thereof is appropriately omitted.

In this disclosure, when an element is described as being "on" another element, the element can be directly on the other element, or there can be one or more elements between the element and the other element.

First Embodiment

FIG. 1 is a block diagram of an exemplary schematic configuration of an imaging display system 1 according to a first embodiment of the present invention. As illustrated in FIG. 1, the imaging display system 1 according to the first embodiment includes an imaging device 10, a display device 20, and a processing device 30. The imaging device 10 includes an image sensor 11 that takes an image. The display device 20 displays the image. The processing device 30 performs image processing on the image. The imaging display system 1 is an on-board imaging display system mounted on a vehicle (for example, a car 100) serving as a movable body that moves in a certain direction on a reference plane, for example.

The imaging device 10 includes not only the image sensor 11 but also a lens 12 that determines an angle of view a of an image taken by the image sensor 11. The imaging device 10 is arranged on a side surface of the car 100, for example. The imaging device 10 is arranged at an angle with respect to a moving direction (arrow A direction in FIG. 1) of the movable body on the reference plane. In other words, the direction of a central axis b in the angle of view a of the image taken by the image sensor 11 is different from the moving direction (arrow A direction in FIG. 1) of the movable body on the reference plane.

When a vehicle on which the imaging display system 1 installed moves in the arrow A direction in FIG. 1, a stopped vehicle 200 moves in the arrow B direction in FIG. 1 in the angle of view of the image taken by the image sensor 11. In the description below, a "moving body" indicates a subject (vehicle 200 in the example illustrated in FIG. 1) that moves in the angle of view of the image taken by the image sensor 11. In the imaging display system 1 according to the present embodiment, a "horizontal direction" indicates a moving direction of a movable body (e.g., the car 100) on which the imaging display system 1 installed, and a "vertical direction" indicates a direction orthogonal to the moving direction. In other words, in the example illustrated in FIG. 1, the vehicle 200 serving as a moving body moves in the horizontal direction.

The image sensor 11 according to the present embodiment is a rolling shutter image sensor serving as a CMOS image sensor having a line sequential scanning system. The image sensor 11 includes a plurality of light-receiving pixels arrayed in the horizontal direction (row direction) and the vertical direction (column direction). The light-receiving pixels are exposed to light sequentially with a certain time difference from a first side to a second side in the horizontal direction in units of light-receiving pixel columns (lines) aligned in the vertical direction (column direction). The image sensor 11 according to the present embodiment takes an image while performing scanning from the first side to the second side in the horizontal direction. In other words, an imaging scanning direction of an image on the image sensor 11 of the imaging device 10 according to the present embodiment is horizontal with respect to the reference plane on which the car 100 having the imaging display system 1 moves.

The image sensor 11 outputs image data corresponding to the angle of view of the imaging device 10 determined by the lens 12. More specifically, the image sensor 11 includes a Bayer arrangement color filter, for example, and can generate a color image taken through the lens 12. The image sensor 11 generates a Bayer arrangement image of one frame composed of a plurality of pieces of image data and outputs data indicating output values of the respective light-receiving pixels constituting the CMOS image sensor.

The processing device 30 includes an image processor 31 and a synchronization signal generator 32. The image processor 31 performs, on image data output from the image sensor 11, image processing for displaying an image taken by the image sensor 11 on the display device 20. The synchronization signal generator 32 is a timing control circuit mounted on a glass substrate by the chip-on-glass (COG) technology, for example. The synchronization signal generator 32 synchronizes a timing at which the imaging device 10 images an image with a timing at which the display device 20 displays the image. The synchronization signal generator 32 generates and outputs synchronization signals to the imaging device 10 and the display device 20.

Figure 2:
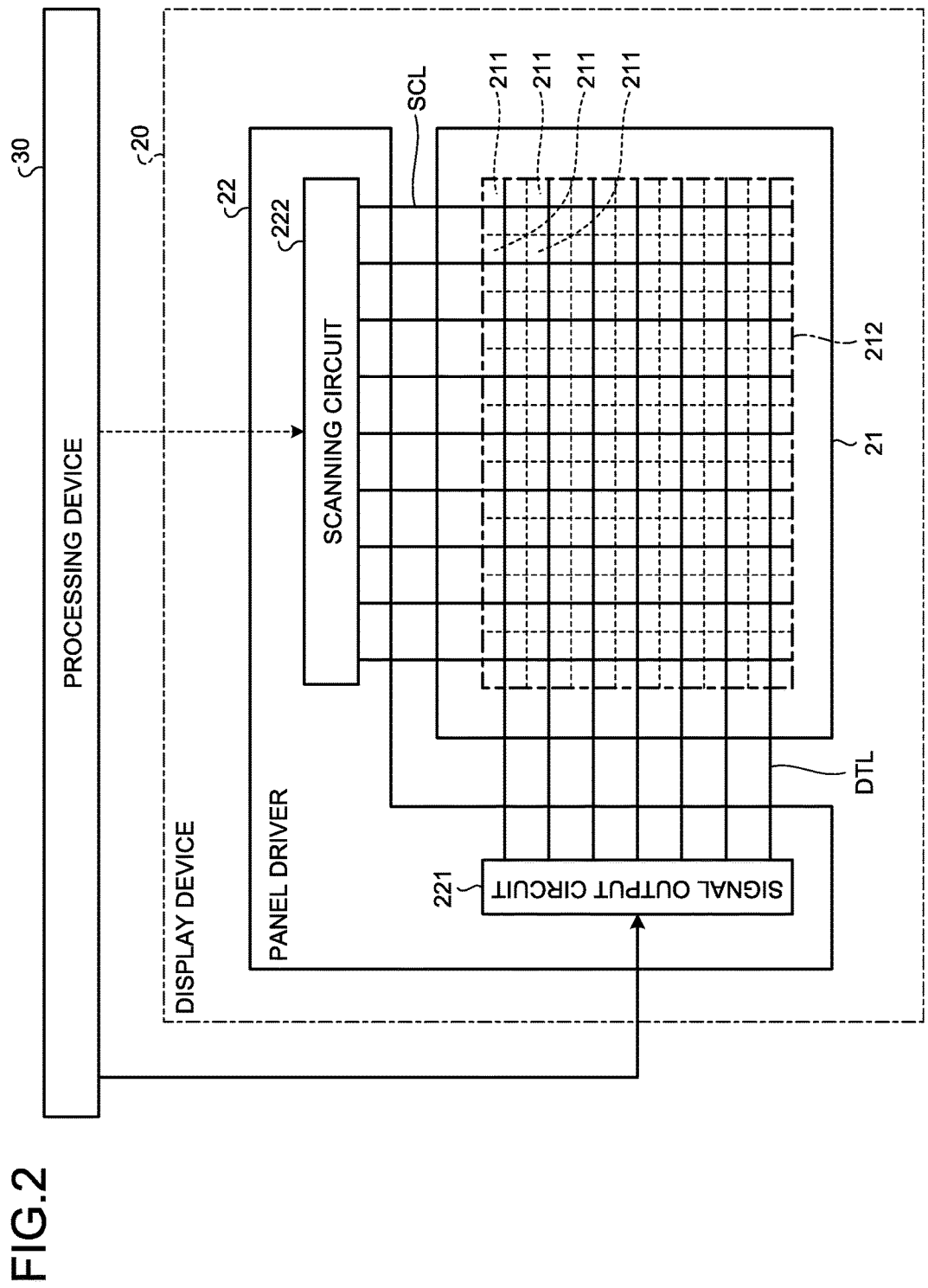
FIG. 2 is a block diagram of an exemplary configuration of a display device of the imaging display system according to the first embodiment.

The display device 20 is a color liquid crystal display device, for example, and includes an image display panel 21 and a panel driver 22 that controls driving of the image display panel 21. The display device 20 is arranged on a center console of the car 100, for example. FIG. 2 is a block diagram of an exemplary configuration of the display device of the imaging display system according to the first embodiment.

As illustrated in FIG. 2, the image display panel 21 has a display area 212 in which a plurality of display pixels 211 are arrayed in the horizontal direction (row direction) and the vertical direction (column direction). In the description below, the row in which the display pixels 211 are aligned in the row direction is referred to as a pixel row, and the column in which the display pixels 211 are aligned in the column direction is referred to as a pixel column.

The panel driver 22 includes a signal output circuit 221 and a scanning circuit 222.

The signal output circuit 221 is a source driver and electrically coupled to the image display panel 21 via signal lines DTL. The signal output circuit 221 generates video signals for driving the display pixels 211 in each pixel row based on image data output from the processing device 30 (image processor 31). The signal output circuit 221 outputs the video signals to the respective pixel rows via the signal lines DTL.

The scanning circuit 222 is a gate driver and includes a shift register and a buffer, for example. The scanning circuit 222 is electrically coupled to the image display panel 21 via scanning lines SCL. The scanning circuit 222 generates scanning signals based on synchronization signals including shift clocks and start pulses output from the processing device 30 (synchronization signal generator 32). The scanning circuit 222 outputs the scanning signals to the respective pixel columns via the scanning lines SCL.

The scanning signals output from the scanning circuit 222 are sequentially output in the same direction as the imaging scanning direction of the image sensor 11. As a result, the display scanning direction of the image displayed on the image display panel 21 coincides with the imaging scanning direction of the image sensor 11.

FIGS. 3A and 3B are diagrams each illustrating an example of a display image displayed by the imaging display system according to the first embodiment. FIG. 3A illustrates an example of a display image in a case where, in the imaging display system 1 according to the first embodiment, the moving direction (arrow B direction) of the moving body (vehicle 200) in the angle of view of the image sensor 11 is the same as the imaging scanning direction of the image sensor 11 and the display scanning direction of the image display panel 21. In other words, in the example illustrated in FIG. 3A, the direction of components parallel to the moving direction of the car 100 in the imaging scanning direction of the image on the image sensor 11 coincides with the moving direction of the car 100. FIG. 3B illustrates an example of a display image in a case where the moving direction (arrow B direction) of the moving body (vehicle 200) in the angle of view of the image sensor 11 in the imaging display system 1 according to the first embodiment is opposite to the imaging scanning direction of the image sensor 11 and the display scanning direction of the image display panel 21. In other words, in the example illustrated in FIG. 3B, the direction of components parallel to the moving direction of the car 100 in the imaging scanning direction of the image on the image sensor 11 is opposite to the moving direction of the car 100.

FIG. 4 is a diagram illustrating a display image of a comparative example compared to the imaging display system according to the first embodiment. FIG. 4 illustrates a display image in the comparative example where the moving direction (arrow B direction) of the moving body (vehicle 200) in the angle of view of the image sensor 11 is orthogonal to the imaging scanning direction of the image sensor 11 and the display scanning direction of the image display panel 21 unlike the imaging display system 1 according to the first embodiment.

In a case where the moving direction (arrow B direction) of the moving body in the angle of view of the image sensor 11 is orthogonal to the imaging scanning direction of the image sensor 11 and the display scanning direction of the image display panel as illustrated in FIG. 4, the moving body (vehicle 200) is displayed as an obliquely distorted image. By contrast, the imaging display system 1 according to the present embodiment can eliminate or reduce distortion of the moving object (vehicle 200) in an oblique direction illustrated in the comparative example in FIG. 4, although the aspect ratio in the moving direction (horizontal direction) of the moving body varies as illustrated in FIGS. 3A and 3B.

Figure 5A:
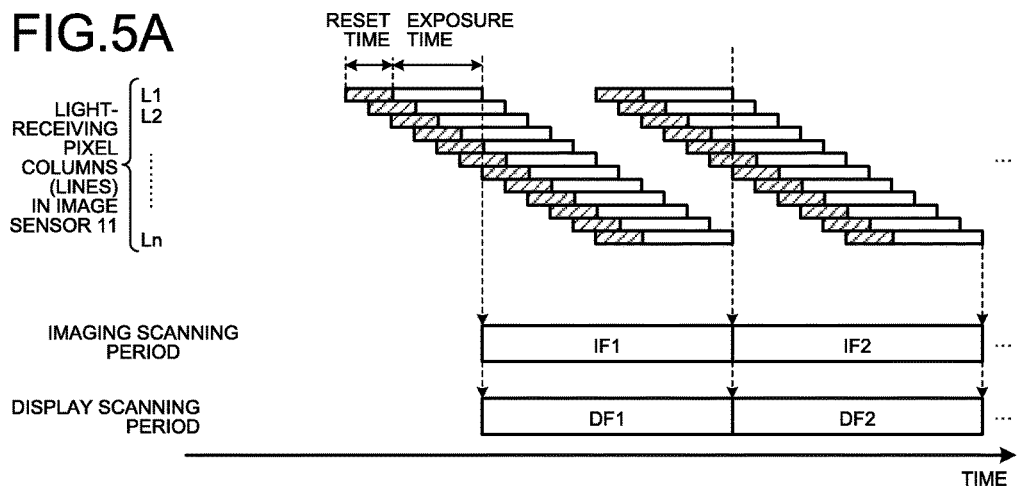
FIGS. 5A to 5C are diagrams each illustrating an example of a timing chart of imaging scanning periods and display scanning periods of the imaging display system according to the first embodiment.
Figure 5B:
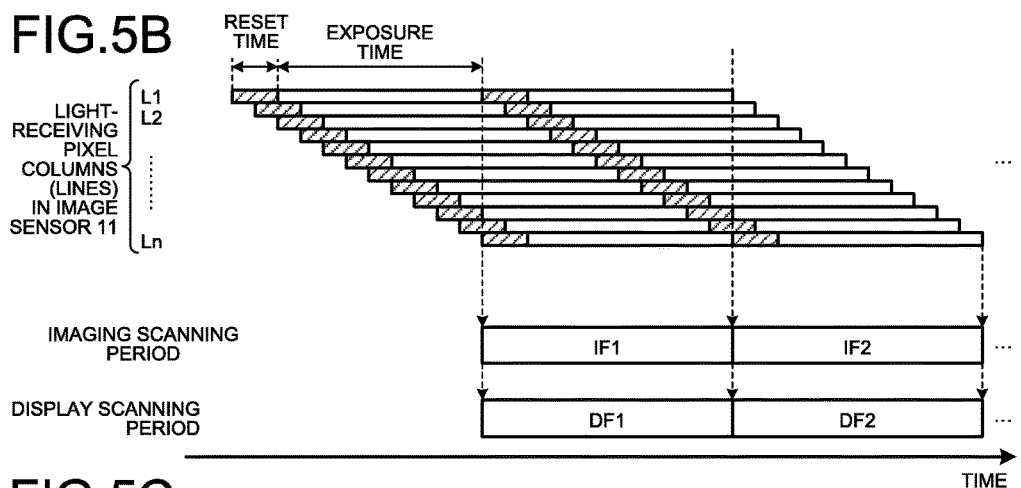
Figure 5C:
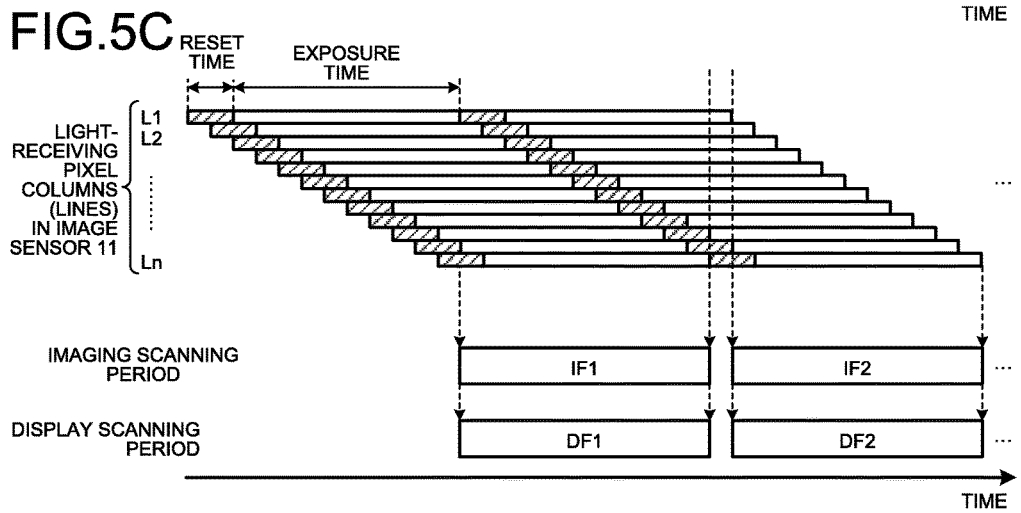

FIGS. 5A to 5C are diagrams each illustrating an example of a timing chart of imaging scanning periods and display scanning periods of the imaging display system 1 according to the first embodiment. FIGS. 5A to 5C schematically illustrate the relation between reset times and exposure times of respective light-receiving pixel columns (lines) L1 to Ln in the image sensor 11, imaging scanning periods IF1, IF2, . . . of the imaging device 10, and display scanning periods DF1, DF2, . . . of the display device 20. FIG. 5A illustrates an example where the exposure times of the respective light-receiving pixel columns L1 to Ln are relatively short and where the length of the period obtained by adding the reset time and the exposure time of each of the light-receiving pixel columns L1 to Ln is shorter than the imaging scanning periods IF1, IF2, . . . . FIG. 5B illustrates an example where the length of the period obtained by adding the reset time and the exposure time of each of the light-receiving pixel columns L1 to Ln is equal to the imaging scanning periods IF1, IF2, . . . . FIG. 5C illustrates an example where the length of the period obtained by adding the reset time and the exposure time of each of the light-receiving pixel columns L1 to Ln is longer than the imaging scanning periods IF1, IF2, . . . . The examples in FIGS. 5A to 5C do not illustrate image processing time of the image processor 31 or the like in the processing device 30.

As illustrated in FIGS. 5A to 5C, in the imaging display system 1 according to the first embodiment, the light-receiving pixel columns L1 to Ln are reset with a certain time difference, and exposure is started after the reset time has elapsed. After the exposure times of the respective light-receiving pixel columns L1 to Ln have elapsed, the image sensor 11 sequentially outputs image data of the respective light-receiving pixel columns L1 to Ln, thereby forming the imaging scanning periods IF1, IF2, . . . . In other words, the imaging scanning periods IF1, IF2, . . . each correspond to the period from when the exposure time of the light-receiving pixel column L1 has elapsed to when the image data of the light-receiving pixel column Ln is output.

In the imaging display system 1 according to the present embodiment, the synchronization signals output from the synchronization signal generator 32 synchronizes a timing at which the imaging device 10 images an image with a timing at which the display device 20 displays the image. With this configuration, the imaging scanning periods IF1, IF2, . . . are synchronized with the display scanning periods DF1, DF2, . . . , respectively. As illustrated in FIGS. 5A and 5B, the imaging display system 1 can set the exposure times of the respective light-receiving pixel columns L1 to Ln in the image sensor 11 without changing the display frame rate of the display device 20 within a range where the length of the period obtained by adding the reset time and the exposure time of each of the light-receiving pixel columns L1 to Ln is equal to or shorter than the imaging scanning periods IF1, IF2, . . . . By contrast, if the length of the period obtained by adding the reset time and the exposure time of each of the light-receiving pixel columns L1 to Ln exceeds the imaging scanning periods IF1, IF2, . . . as illustrated in FIG. 5C, the display frame rate of the display device 20 is reduced.

FIG. 6 is a diagram illustrating an example of a timing chart of display frames in a comparative example that uses a global shutter image sensor having a batch exposure system. FIG. 6 schematically illustrates the example of the relation between the reset time and the exposure time of the image sensor, a buffer time for image data, and the display scanning periods DF1, DF2, . . . of the display device. FIG. 6 illustrates no image processing time for image data or the like output from the imaging device.

The comparative example illustrated in FIG. 6 is an example that uses a global shutter image sensor having a batch exposure system, such as a CCD image sensor. In this case, the light-receiving pixels constituting the image sensor are reset at a time, and exposure is started after the reset time has elapsed. After the exposure time of the light-receiving pixels has elapsed, image data of one frame output from the light-receiving pixels of the image sensor is stored in a buffer memory. After the buffer time has elapsed, the image data of one frame is output to the display device, thereby forming the display scanning periods DF1, DF2, . . . . The display scanning periods DF1, DF2, . . . are determined depending on the display frame rate of the display device.

The use of a global shutter image sensor having a batch exposure system does not cause moving body distortion theoretically. The image sensor, however, needs to store the image data of one frame after the batch exposure and then output the image data in synchronization with display scanning on each line of the display device, as illustrated in FIG. 6. This configuration requires a buffer memory that stores therein the image data of one frame.

FIG. 7 is a diagram illustrating an example of a timing chart of the display frames in another comparative example that provides a global shutter by using a mechanical shutter in combination with an image sensor having a line sequential scanning system. FIG. 7 schematically illustrates the example of the relation between a shutter close period and a shutter open period of the mechanical shutter, the buffer time for image data, and the display scanning periods DF1, DF2, . . . of the display device.

The comparative example illustrated in FIG. 7 is an example that provides a global shutter by using a mechanical shutter in combination with a CMOS image sensor having a line sequential scanning system. In this case, the period in which all the lines can be exposed to light corresponds to the shutter open period (batch exposure time), and the period including the reset times of the respective lines corresponds to the shutter close period. In the shutter close period after the shutter open period (batch exposure time) has elapsed, image data of all the lines output from the image sensor is stored in a buffer memory. After the buffer time has elapsed, the image data of one frame is output to the display device, thereby forming the display scanning periods DF1, DF2, . . . .

Similarly to the case where a global shutter image sensor having a batch exposure system illustrated in FIG. 6, the comparative example illustrated in FIG. 7 does not cause moving body distortion theoretically. The image sensor, however, needs to store the image data of one frame in the shutter close period and then output the image data in synchronization with display scanning on each line of the display device. This configuration requires a buffer memory that stores therein the image data of one frame. In addition, the comparative example illustrated in FIG. 7 fails to make the display frame rate of the display device equal to or higher than a repetition frequency between the shutter close period and the shutter open period (batch exposure time).

In a case where a CMOS area sensor that implements a global shutter function without using any mechanical shutter is used as described in JP-A-2008-157880, a circuit having the global shutter function needs to be installed in the image sensor, which complicates circuits included in the image sensor. This configuration makes the area of the photodiode smaller and reduces the aperture ratio. As a result, the CMOS area sensor has a lower sensitivity and a narrower dynamic range than a CMOS image sensor having no global shutter function.

By contrast, the imaging display system 1 according to the first embodiment illustrated in FIGS. 5A to 5C uses a rolling shutter image sensor serving as a CMOS image sensor having a line sequential scanning system as the image sensor 11. The imaging display system 1 causes the moving direction of the moving body in the angle of view of the image sensor 11 to coincide with the imaging scanning direction of the image sensor 11 and the display scanning direction of the image display panel 21. With this mechanism, the imaging display system 1 can eliminate or reduce distortion in an oblique direction of the moving object displayed on the image display panel 21 with no buffer memory or no mechanical shutter without complicating the circuit in the image sensor 11 or lowering the sensitivity of the image sensor 11. Consequently, the imaging display system 1 can eliminate or reduce erroneous recognition of a visible distance.

The imaging display system 1 can reduce restrictions on the frame rate and the exposure time as compared with the comparative example that provides a global shutter by using a mechanical shutter in combination with an image sensor having a line sequential scanning system illustrated in FIG. 7. Furthermore, the imaging display system 1 can provide a wider dynamic range than a configuration including a circuit that implements a global shutter function in the image sensor.

As described above, the imaging display system 1 according to the first embodiment is mounted on a movable body (e.g., the car 100) that moves in a certain direction on a reference plane. The imaging display system 1 uses a rolling shutter image sensor serving as a CMOS image sensor having a line sequential scanning system as the image sensor 11 of the imaging device 10. The imaging display system 1 causes the imaging scanning direction of an image on the image sensor 11 of the imaging device 10 to be parallel to the reference plane and causes the display scanning direction of the image displayed on the display device 20 to coincide with the imaging scanning direction of the image on the image sensor 11. Consequently, the imaging display system 1 can eliminate or reduce distortion of a moving object in an oblique direction of the angle of view of the image sensor 11, thereby eliminating or reducing erroneous recognition of a visible distance.

The imaging display system 1 does not require any buffer memory required in a case where a global shutter image sensor having a batch exposure system is used or a case where a global shutter is provided by using a mechanical shutter in combination with an image sensor having a line sequential scanning system.

The imaging display system 1 can simplify the structure of the image sensor 11 as compared with a case where a CMOS area sensor that implements a global shutter function without using any mechanical shutter is used. Consequently, the imaging display system 1 can provide a wider dynamic range without lowering the sensitivity of the image sensor 11.

The present embodiment thus can provide the imaging display system 1 that can eliminate or reduce erroneous recognition of a visible distance caused by moving body distortion in an image displayed on the display device 20 without complicating the circuit in the image sensor 11.

Second Embodiment

Figure 8:
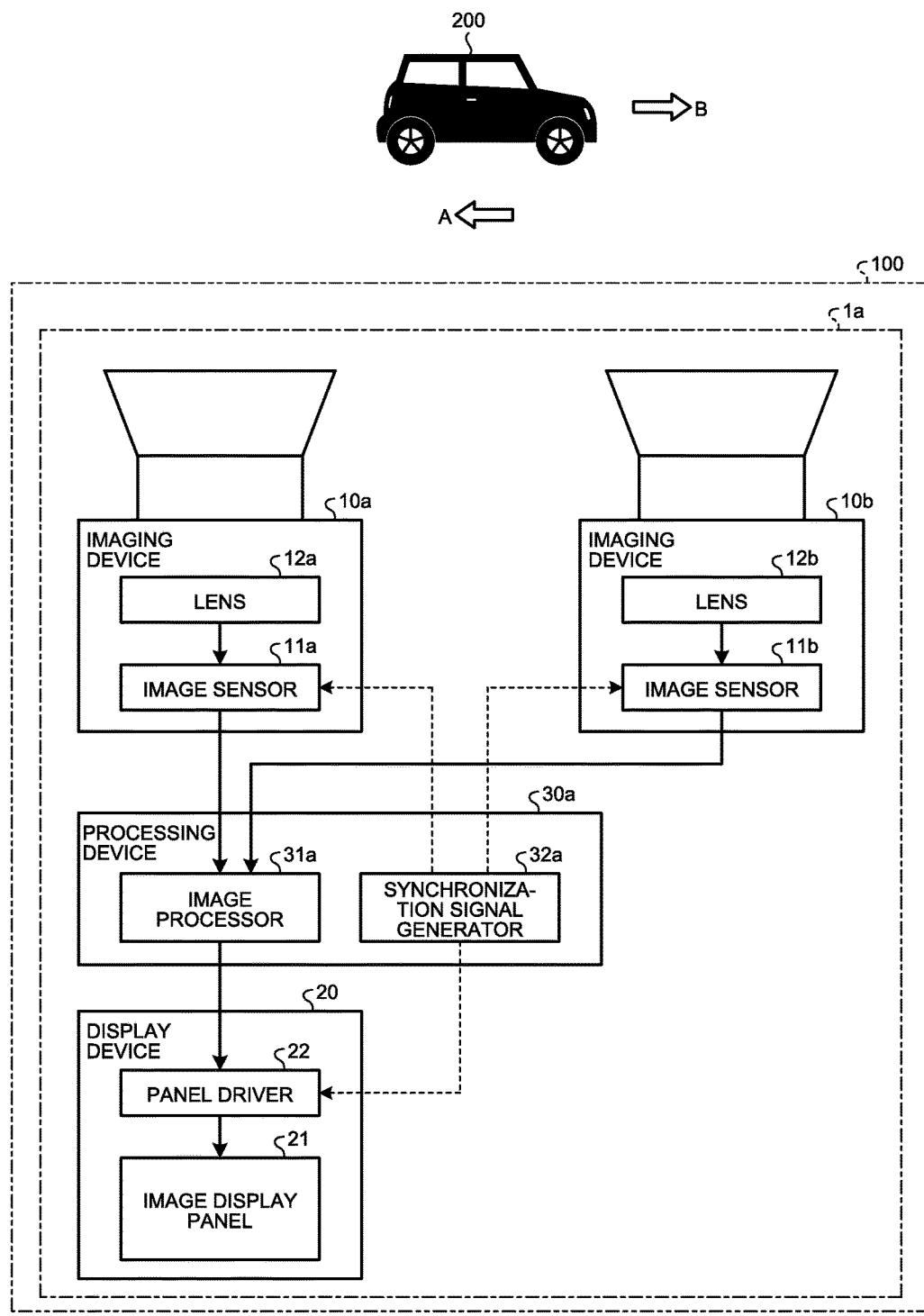
FIG. 8 is a block diagram of an exemplary schematic configuration of an imaging display system according to a second embodiment of the present invention.

FIG. 8 is a block diagram of an exemplary schematic configuration of an imaging display system 1a according to a second embodiment of the present invention. The same components as those described in the embodiment above are denoted by the same reference numerals, and overlapping explanation thereof is omitted.

As illustrated in FIG. 8, the imaging display system 1a according to the second embodiment includes a plurality of (two in the present embodiment) imaging devices 10a and 10b having the same angle of view. The imaging devices 10a and 10b are arranged in the horizontal direction so as to form one image when the respective angles of view are arranged side by side (in a line). The imaging devices 10a and 10b are preferably products of the same model or like-quality products.

Similarly to the first embodiment, an image sensor 11a of the imaging device 10a and an image sensor 11b of the imaging device 10b are rolling shutter image sensors serving as CMOS image sensors having a line sequential scanning system. The image sensors 11a and 11b each include a plurality of light-receiving pixels arrayed in the horizontal direction (row direction) and the vertical direction (column direction). The light-receiving pixels are exposed to light sequentially with a certain time difference from a first side to a second side in the horizontal direction in units of light-receiving pixel columns (lines) aligned in the vertical direction (column direction). The image sensors 11a and 11b take an image while performing scanning from the first side to the second side in the horizontal direction. With this mechanism, the imaging scanning direction of the image sensors 11a and 11b coincides with the moving direction (horizontal direction) of the car 100 on which the imaging display system 1a is installed.

An image processor 31a of a processing device 30a performs image processing for displaying an image taken by the image sensor 11a and an image taken by the image sensor 11b in a manner arranged in the horizontal direction on the display device 20. A synchronization signal generator 32a will be described later.

Figure 9:
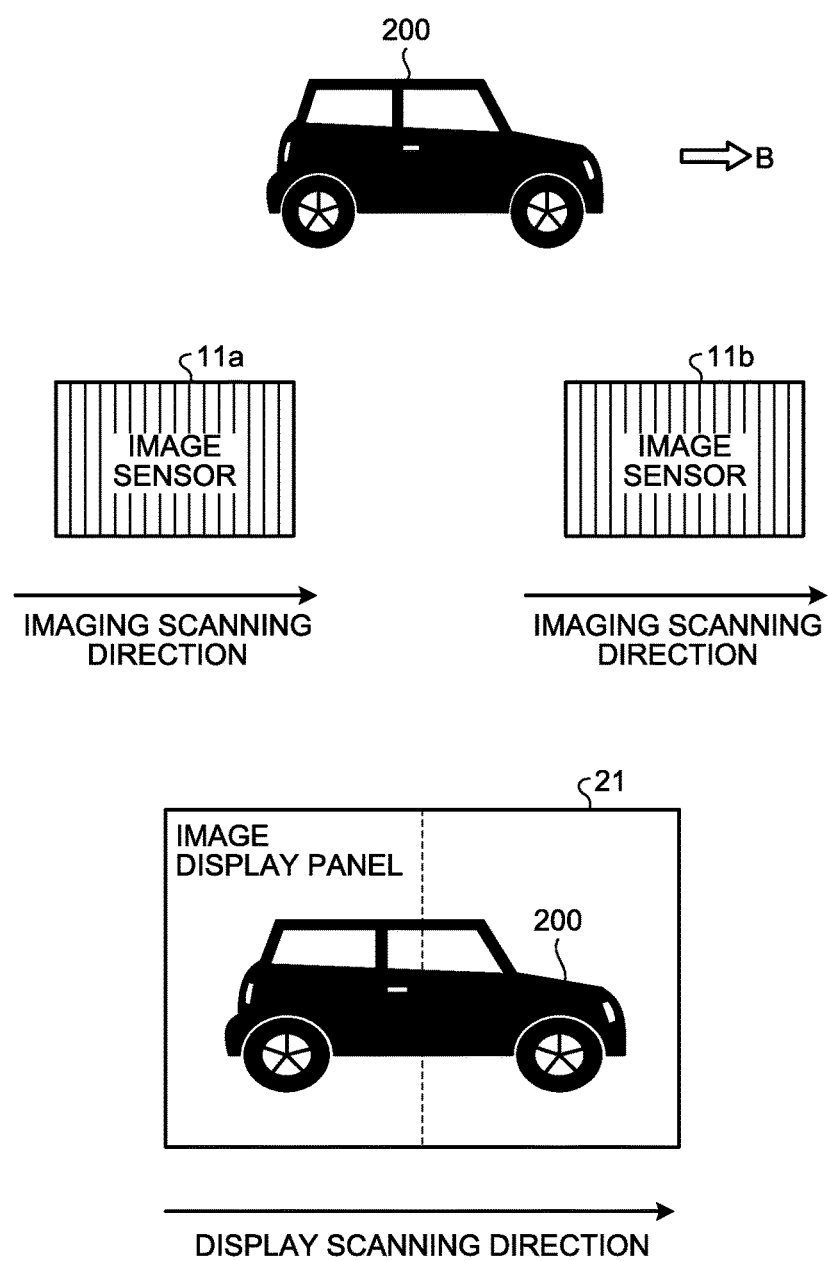
FIG. 9 is a diagram of an example of a display image displayed by the imaging display system according to the second embodiment.

FIG. 9 is a diagram of an example of a display image displayed by the imaging display system according to the second embodiment. FIG. 9 illustrates an example of a display image in a case where the moving direction (arrow B direction) of a moving body (vehicle 200) in the angles of view of the image sensors 11a and 11b is the same as the imaging scanning direction of the image sensors 11a and 11b and the display scanning direction of the image display panel 21.

Figure 10:
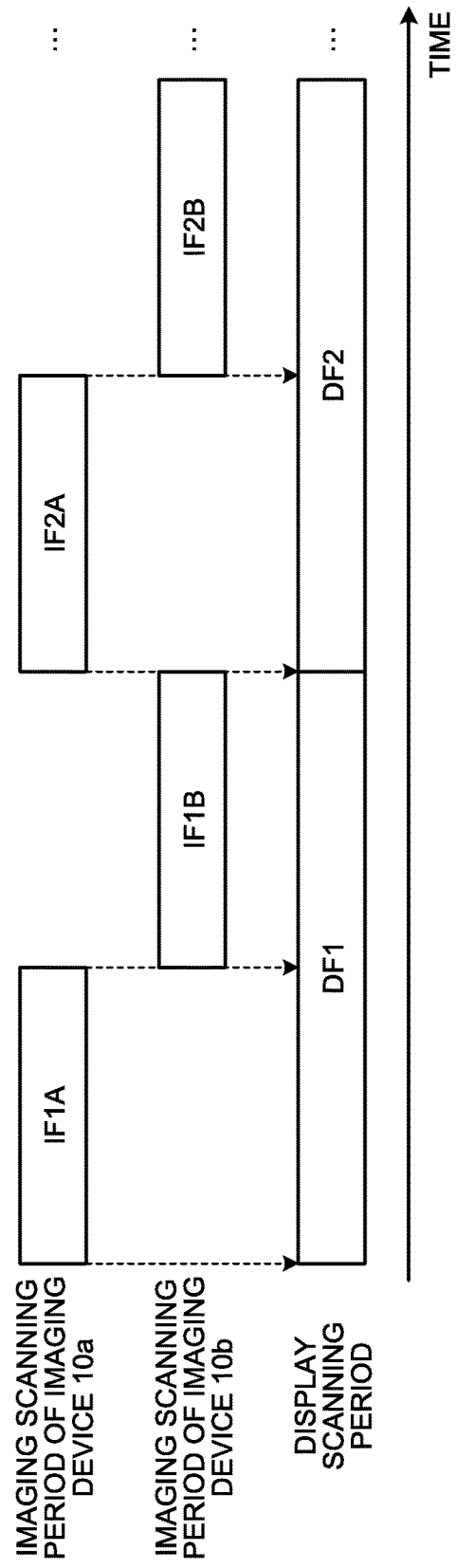
FIG. 10 is a diagram illustrating an example of a timing chart of the imaging scanning periods and the display scanning periods of the imaging display system according to the second embodiment.

FIG. 10 is a diagram illustrating an example of a timing chart of the imaging scanning periods and the display scanning periods of the imaging display system 1a according to the second embodiment. FIG. 10 schematically illustrates an example of the relation between imaging scanning periods IF1A, IF2A, . . . of the imaging device 10a, imaging scanning periods IF1B, IF2B, . . . of the imaging device 10b, and the display scanning periods DF1, DF2, . . . of the display device 20. FIG. 10 illustrates no image processing time of the image processor 31a or the like in the processing device 30a.

The imaging display system 1a according to the present embodiment includes a plurality of (two in the present embodiment) imaging devices 10a and 10b arranged in the horizontal direction. The imaging devices 10a and 10b include the image sensors 11a and 11b and lenses 12a and 12b, respectively. This configuration causes the angle of view of one imaging device in the imaging display system 1a to be narrower than that of the imaging display system 1 according to the first embodiment. Consequently, the imaging display system 1a can eliminate or reduce distortion in a subject image more than the imaging display system 1 according to the first embodiment does.

The synchronization signal generator 32a of the processing device 30a according to the present embodiment generates and outputs synchronization signals to the imaging device 10a, the imaging device 10b, and the display device 20 so as to form the display scanning period in which an image taken by the imaging device 10a and an image taken by the imaging device 10b are successively displayed in order of the scanning directions illustrated in FIG. 9. With this configuration, the image taken by the imaging device 10a and the image taken by the imaging device 10b are synthesized side by side in the horizontal direction to form one image. The synthesized image is displayed on the image display panel 21.

Figure 11:
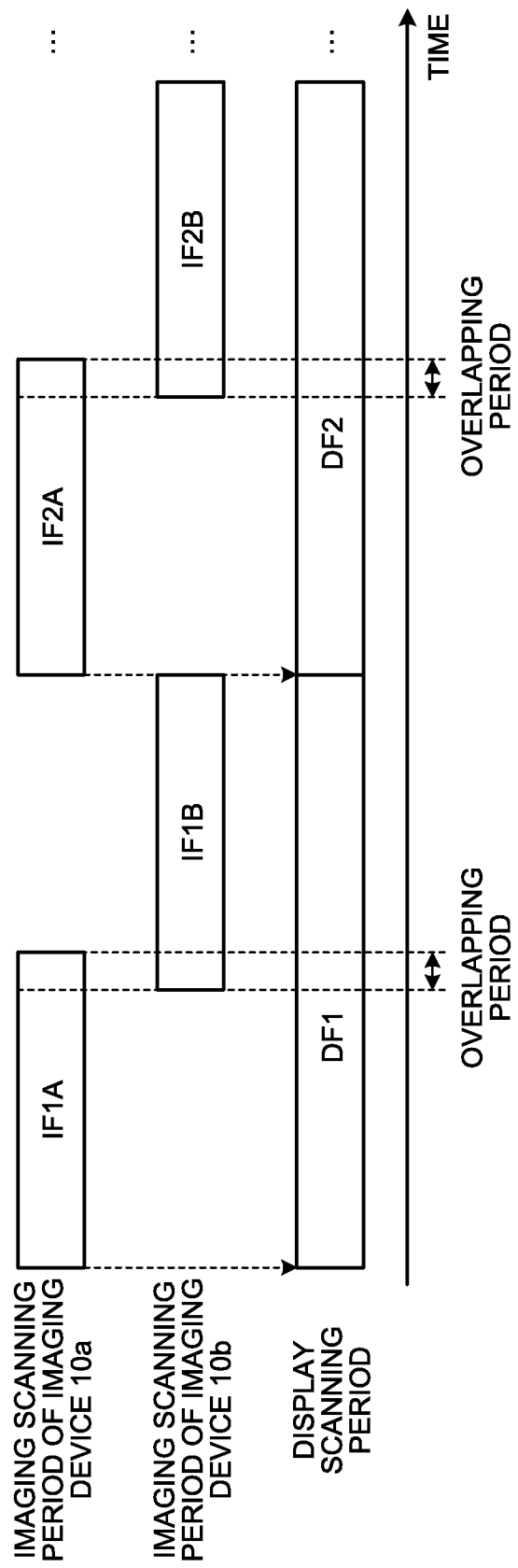
FIG. 11 is a diagram illustrating a modification of the timing chart of the imaging scanning periods and the display scanning periods of the imaging display system according to the second embodiment.

FIG. 11 is a diagram illustrating a modification of the timing chart of the imaging scanning periods and the display scanning periods of the imaging display system 1a according to the second embodiment. FIG. 11 illustrates an example where the angles of view of a plurality of (two in the present embodiment) imaging devices 10a and 10b having the same angle of view overlap in the horizontal direction.

If the angles of view of the imaging devices 10a and 10b overlap, the synchronization signal generator 32a generates synchronization signals for the imaging device 10a and the imaging device 10b such that the periods of imaging scanning on the same part in the images to be taken by the image sensors 11a and 11b overlap as illustrated in FIG. 11.

The image processor 31a switches the imaging scanning period of the imaging device 10a and the imaging scanning period of the imaging device 10b at any timing in the overlapping period, such as an imaging scanning start timing of the image sensor 11b or an imaging scanning end timing of the image sensor 11a, to form the display scanning period.

As described above, the imaging display system 1a according to the second embodiment includes the imaging devices 10a and 10b arranged in the moving direction of the movable body. The imaging devices 10a and 10b have the same angle of view. The imaging display system 1a synthesizes an image taken by the imaging device 10a and an image taken by the imaging device 10b to form one image. With this configuration, the imaging display system 1a can make the angle of view of one imaging device narrower. Consequently, the imaging display system 1a can eliminate or reduce distortion in a subject image more than the first embodiment does.

Third Embodiment

Figure 12:
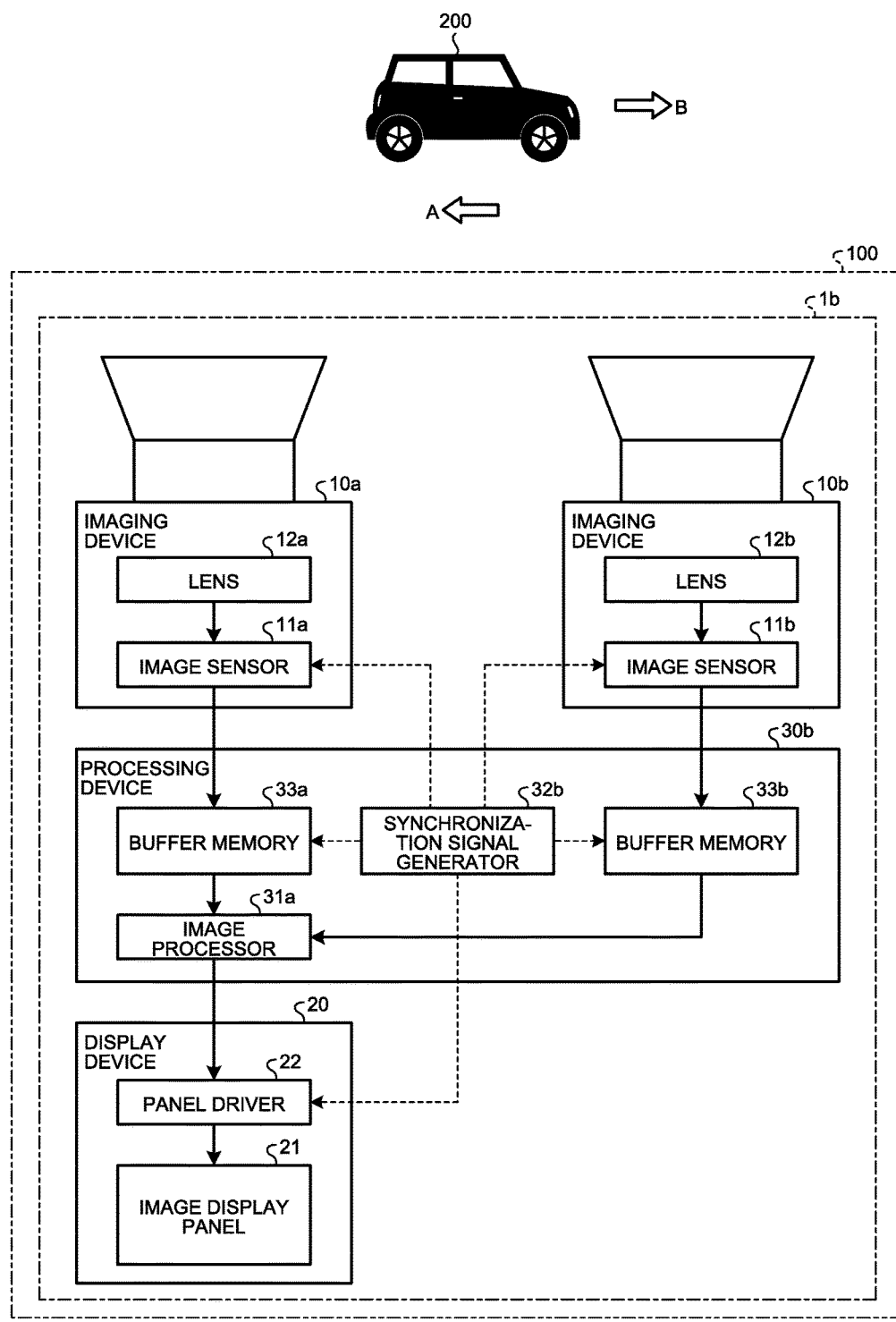
FIG. 12 is a block diagram of an exemplary schematic configuration of an imaging display system according to a third embodiment of the present invention.

FIG. 12 is a block diagram of an exemplary schematic configuration of an imaging display system 1b according to a third embodiment of the present invention. The same components as those described in the embodiments above are denoted by the same reference numerals, and overlapping explanation thereof is omitted.

As illustrated in FIG. 12, a processing device 30b of the imaging display system 1b according to the third embodiment includes a buffer memory 33a and a buffer memory 33b besides the configuration according to the second embodiment. The buffer memory 33a stores therein image data output from the image sensor 11a in each imaging scanning period of the imaging device 10a based on synchronization signals output from a synchronization signal generator 32b. The buffer memory 33b stores therein image data output from the image sensor 11b in each imaging scanning period of the imaging device 10b based on synchronization signals output from a synchronization signal generator 32b.

Each of the buffer memories 33a and 33b according to the present embodiment is a memory that enables simultaneous writing and reading of data, such as a dual-port memory or a first-in first-out (FIFO) memory.

Similarly to the imaging display system 1a according to the second embodiment, the imaging display system 1b according to the present embodiment includes a plurality of (two in the present embodiment) imaging devices 10a and 10b arranged in the horizontal direction. This configuration causes the angle of view of one imaging device in the imaging display system 1b to be narrower than that of the imaging display system 1 according to the first embodiment. Consequently, the imaging display system 1b can eliminate or reduce distortion in a subject image more than the imaging display system 1 according to the first embodiment does.

Figure 13:
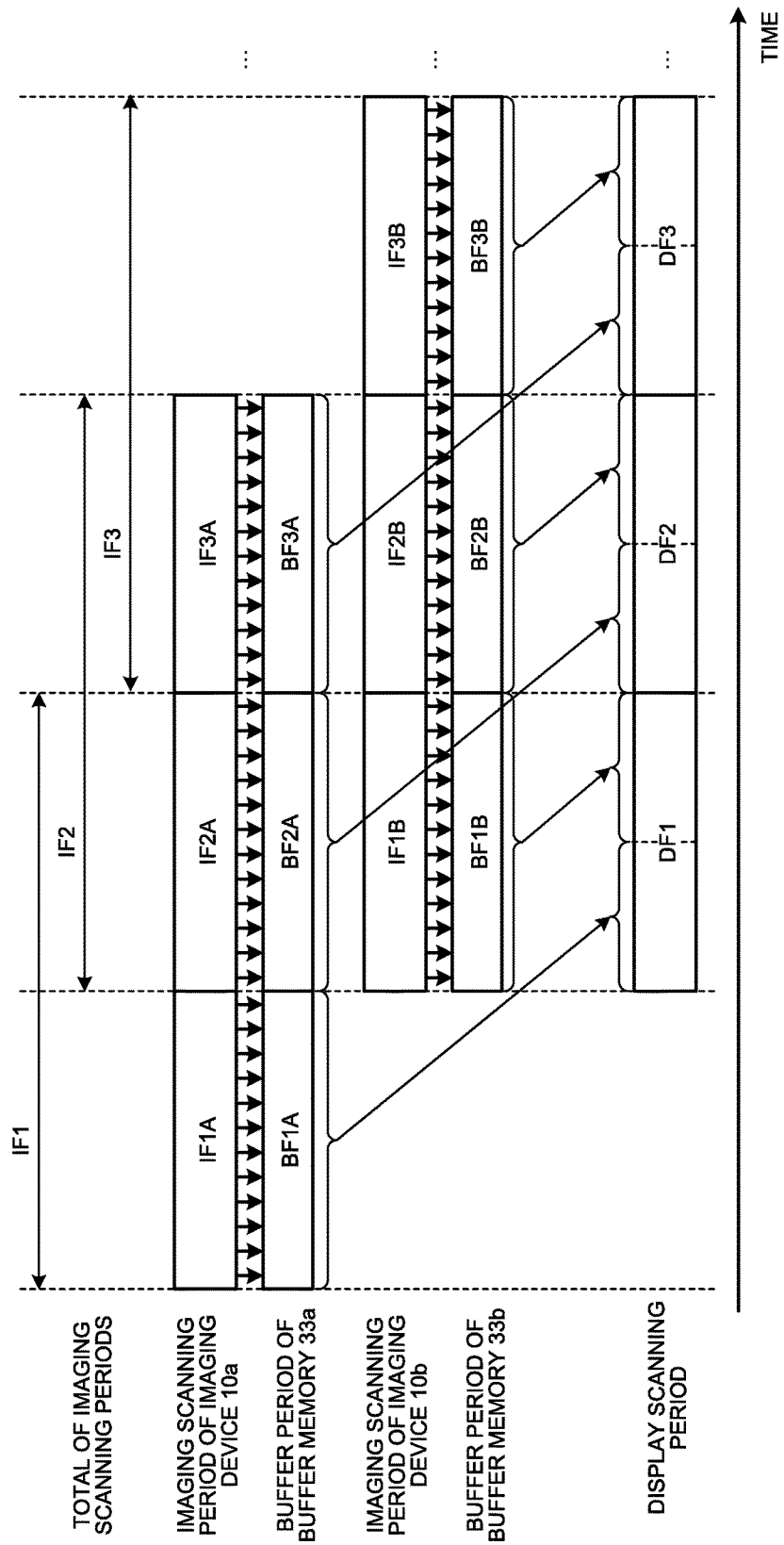
FIG. 13 is a diagram illustrating an example of a timing chart of the imaging scanning periods and the display scanning periods of the imaging display system according to the third embodiment.

FIG. 13 is a diagram illustrating an example of a timing chart of the imaging scanning periods and the display scanning periods of the imaging display system 1b according to the third embodiment. FIG. 13 schematically illustrates an example of the relation between the imaging scanning periods IF1A, IF2A, . . . of the imaging device 10a, the imaging scanning periods IF1B, IF2B, . . . of the imaging device 10b, buffer periods BF1A, BF2A, . . . for storing image data output from the imaging device 10a in the buffer memory 33a, buffer periods BF1B, BF2B, . . . for storing image data output from the imaging device 10b in the buffer memory 33b, and the display scanning periods DF1, DF2, . . . of the display device 20. FIG. 13 illustrates no image processing time of the image processor 31a or the like in the processing device 30b.

The image data taken by the imaging device 10a in the imaging scanning period IF1A is sequentially stored in the buffer memory 33a. The image data taken by the imaging device 10b in the imaging scanning period IF1B is sequentially stored in the buffer memory 33b.

The image data stored in the buffer memory 33a in the buffer period BF1A and the image data stored in the buffer memory 33b in the buffer period BF1B are successively read, thereby forming the display scanning period DF1.

If all the image data stared in the buffer period BF1A are read, the image data taken by the imaging device 10a in the next imaging scanning period IF2A is sequentially stored in the buffer memory 33a. If all the image data stored in the buffer period BF1B are read, the image data taken by the imaging device 10b in the next imaging scanning period IF2B is sequentially stored in the buffer memory 33b.

The image data stored in the buffer memory 33a in the buffer period BF2A and the image data stored in the buffer memory 33b in the buffer period BF2B are successively read, thereby forming the display scanning period DF2.

By repeating the processing described above, the imaging display system 1b synthesizes an image taken by the image sensor 11a and an image taken by the image sensor 11b to form one image that secures the continuity in the imaging time of the images. The synthesized image is displayed on the image display panel 21.

The present embodiment uses memories that enable simultaneous writing and reading of data as the buffer memories 33a and 33b. With this configuration, when the imaging display system starts reading of image data stored in the buffer memory in a certain frame, it can also start writing of image data in the next frame.

Figure 14:
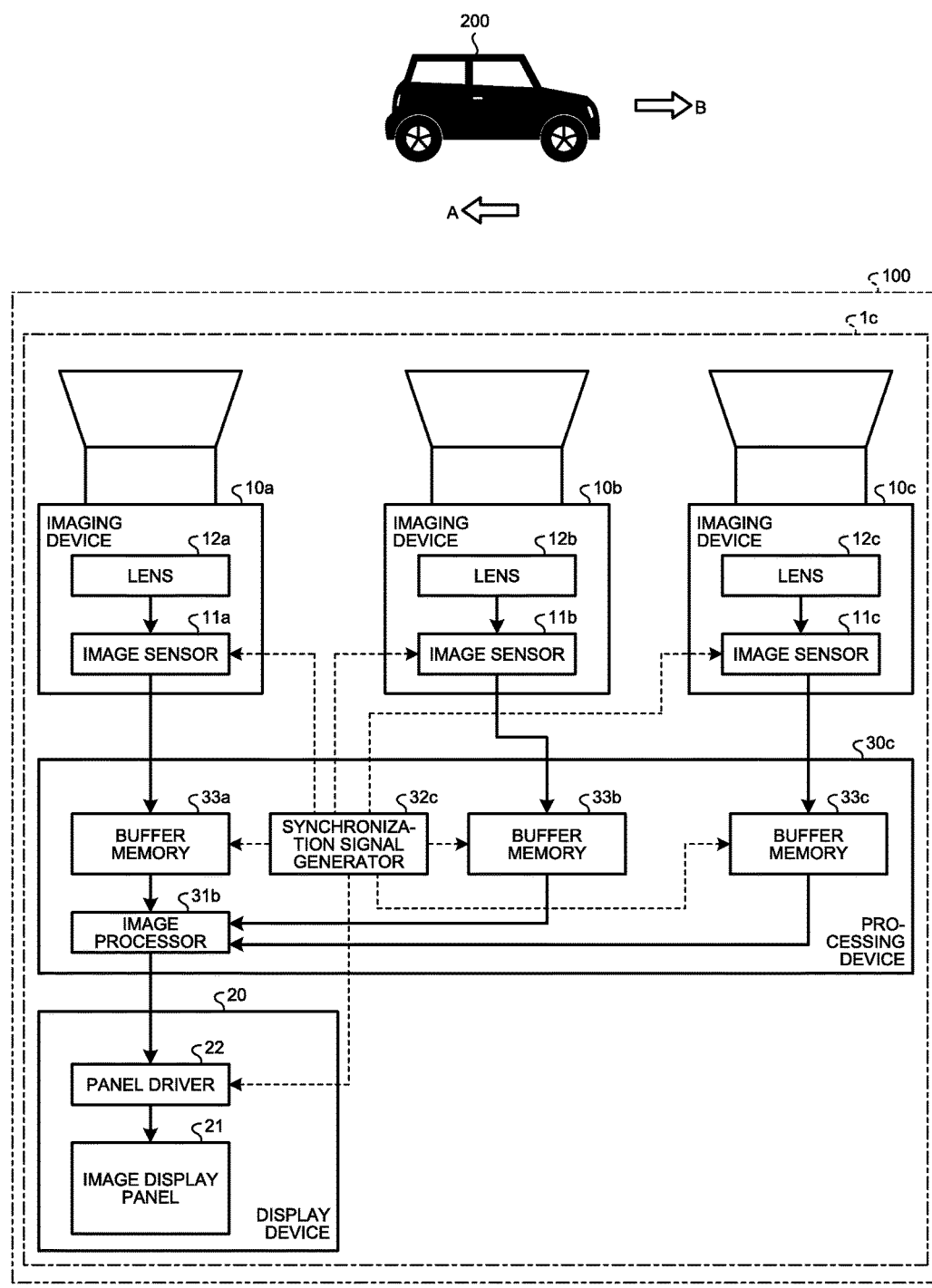
FIG. 14 is a block diagram of an exemplary schematic configuration including three imaging devices in an imaging display system according to the third embodiment.

FIG. 14 is a block diagram of an exemplary schematic configuration including three imaging devices in an imaging display system 1c according to the third embodiment. The imaging display system 1c illustrated in FIG. 14 further includes an imaging device 10c including an image sensor 11c and a lens 12c. A processing device 30c includes a buffer memory 33c that stores therein image data output from the image sensor 11c in each imaging scanning period of the imaging device 10c based on synchronization signals output from a synchronization signal generator 32c.

Similarly to the buffer memories 33a and 33b, the buffer memory 33c is a memory that enables simultaneous writing and reading of data, such as a dual-port memory or a FIFO memory.

An image processor 31b performs image processing for displaying an image taken by the image sensor 11a, an image taken by the image sensor 11b, and an image taken by the image sensor 11c in a manner arranged in the horizontal direction on the display device 20.

Figure 15:
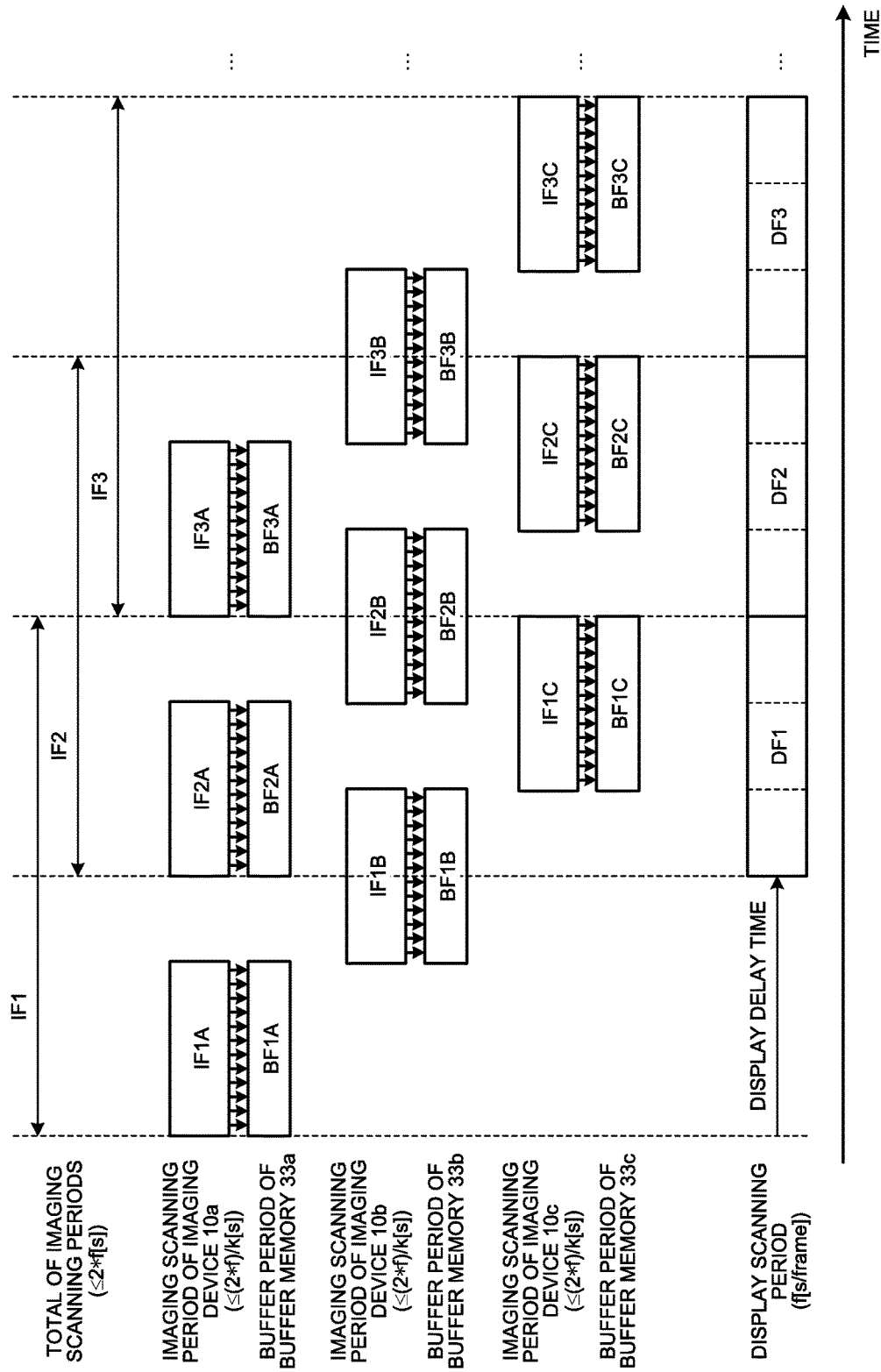
FIG. 15 is a diagram illustrating an example of a timing chart of the imaging scanning periods and the display scanning periods of the configuration illustrated in FIG. 14.

FIG. 15 is a diagram illustrating an example of a timing chart of the imaging scanning periods and the display scanning periods of the configuration illustrated in FIG. 14. FIG. 15 schematically illustrates an example of the relation between the imaging scanning periods IF1A, IF2A, . . . of the imaging device 10a, the imaging scanning periods IF1B, IF2B, . . . of the imaging device 10b, imaging scanning periods IF1C, IF2C, . . . of the imaging device 10c, the buffer periods BF1A, BF2A, . . . for storing image data output from the imaging device 10a in the buffer memory 33a, the buffer periods BF1B, BF2B, . . . for storing image data output from the imaging device 10b in the buffer memory 33b, buffer periods BF1C, BF2C, . . . for storing image data output from the imaging device 10c in the buffer memory 33c, and the display scanning periods DF1, DF2, . . . of the display device 20. The imaging scanning periods IF1A, IF2A, . . . of the imaging device 10a, the imaging scanning periods IF1B, IF2B, . . . of the imaging device 10b, and the imaging scanning periods IF1C, IF2C, . . . of the imaging device 10c are equalized, and each of the imaging scanning periods of the respective imaging devices 10a, 10b, and 10c is set to the maximum. FIG. 15 illustrates no image processing time of the processing device or the like.

Assume that f[s/frame] is a display scanning time per one frame, and k is the number of imaging devices (k=3 in the example illustrated in FIG. 14). In this case, the maximum value of the total of the imaging scanning periods of the respective imaging devices per one frame according to the present embodiment is expressed by $2*f[s]$. The maximum value of the imaging scanning period of each imaging device per one frame is expressed by $(2*f)/k[s]$. The maximum value of a display delay time of the display device 20 is expressed by $f[s]$.

If the number of imaging devices is 2, that is, in the configuration illustrated in FIG. 12, the maximum value of the imaging scanning period of each of the imaging devices 10a and 10b per one frame is $1f[s]$. If the number of imaging devices is 3, that is, in the configuration illustrated in FIG. 14, the maximum value of the imaging scanning period of each of the imaging devices 10a, 10b, and 10c per one frame is $(2/3)*f[s]$. If the number of imaging devices is 4, the maximum value of the imaging scanning period of each imaging device per one frame is $(1/2)*f[s]$.

Typically, the speed of reading data from the image sensor depends on the speed of an interface of the imaging device. Regarding the imaging display system 1a according to the second embodiment illustrated in FIG. 8, assume that f[s/frame] is the display scanning time per one frame, and k is the number of imaging devices (k=2 in the example illustrated in FIG. 8). In this case, the imaging scanning period of each imaging device per one frame is $(1/k)*f[s]$, although the display device 20 theoretically has no display delay time except for the image processing time of the processing device 30a or the like. If the number of imaging devices in the imaging display system 1a according to the second embodiment is equal to the number of imaging devices in the imaging display system according to the third embodiment including the buffer memories that enable simultaneous writing and reading of data for the respective imaging devices, the imaging time of each imaging device in the imaging display system 1a according to the second embodiment is shorter than that of each imaging device in the imaging display system according to the third embodiment. That is, in the imaging display system 1a according to the second embodiment, an increase in the number of imaging devices has more effect on the imaging time per one frame of each imaging device. As a result, the imaging display system 1a has more restrictions on an increase in the display frame rate of the display device 20.

By contrast, the imaging display system 1b according to the third embodiment includes the buffer memories that enable simultaneous writing and reading of data for the respective imaging devices unlike the imaging display system 1a according to the second embodiment. With this configuration, the imaging time per one frame of the imaging devices in the display device 20 becomes longer than that of the imaging display system 1a according to the second embodiment, although the maximum value of the display delay time of the display device 20 is f[s]. In other words, an increase in the number of imaging devices in the imaging display system 1b according to the third embodiment has less effect on the imaging time per one frame of each imaging device than the imaging display system 1a according to the second embodiment. As a result, the imaging display system 1b can reduce restrictions on the increase in the display frame rate of the display device 20.

Figure 16:
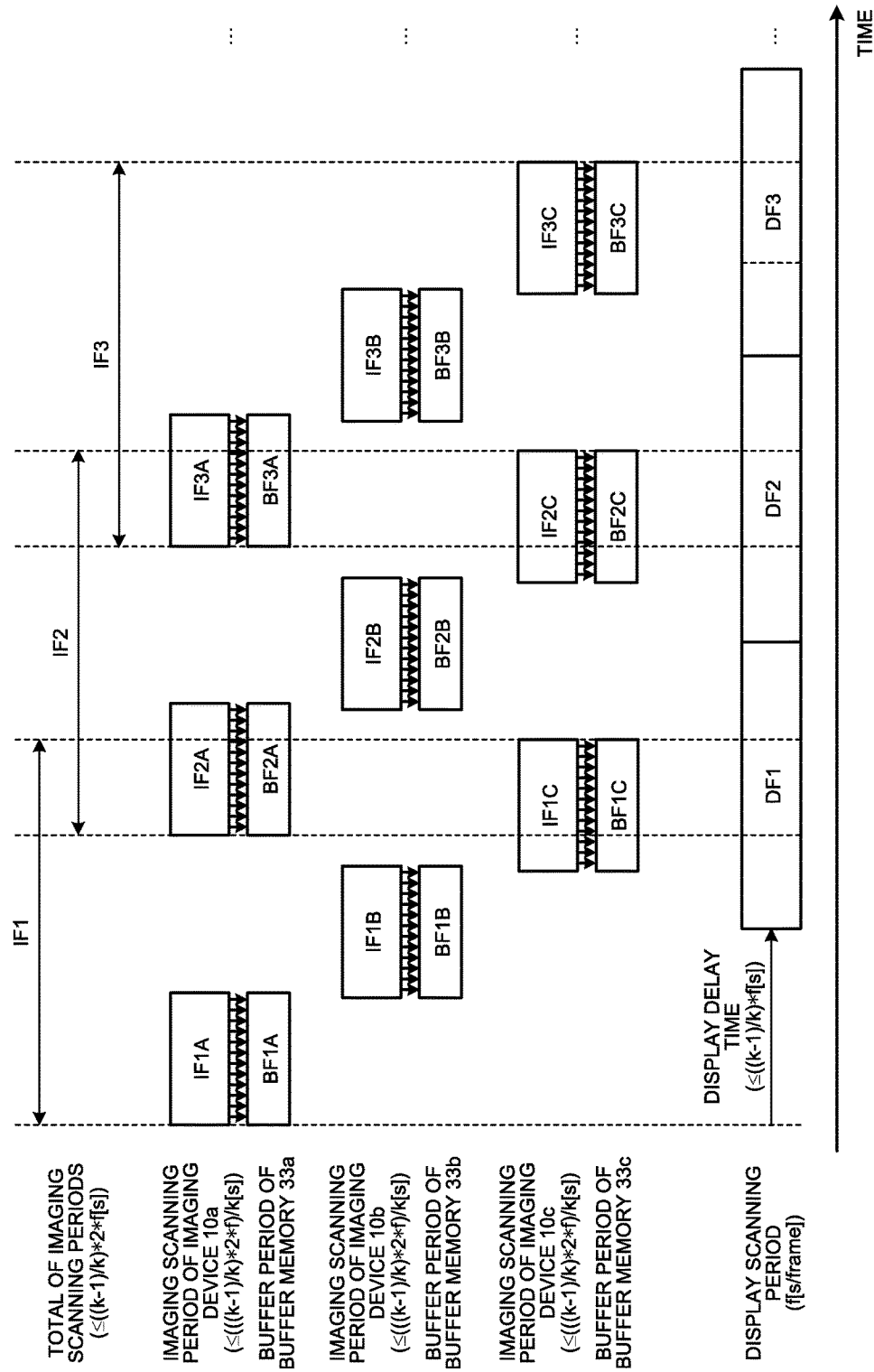
FIG. 16 is a diagram illustrating an example of a timing chart of the imaging scanning periods and the display scanning periods of an imaging display system according to a modification of the third embodiment.

FIG. 16 is a diagram illustrating an example of a timing chart of the imaging scanning periods and the display scanning periods of an imaging display system according to a modification of the third embodiment. The schematic configuration of the imaging display system according to the modification of the third embodiment is the same as the configuration illustrated in FIG. 14 except that the buffer memories 33a, 33b, and 33c are not dual-port memories or FIFO memories that enable simultaneous writing and reading of data.

FIG. 16 schematically illustrates an example of the relation between the imaging scanning periods IF1A, IF2A, . . . of the imaging device 10a, the imaging scanning periods IF1B, IF2B, . . . of the imaging device 10b, the imaging scanning periods IF1C, IF2C, . . . of the imaging device 10c, the buffer periods BF1A, BF2A, . . . for storing image data output from the imaging device 10a in the buffer memory 33a, the buffer periods BF1B, BF2B, . . . for storing image data output from the imaging device 10b in the buffer memory 33b, the buffer periods BF1C, BF2C, . . . for storing image data output from the imaging device 10c in the buffer memory 33c, and the display scanning periods DF1, DF2, . . . of the display device 20. The imaging scanning periods IF1A, IF2A, . . . of the imaging device 10a, the imaging scanning periods IF1B, IF2B, . . . of the imaging device 10b, and the imaging scanning periods IF1C, IF2C, . . . of the imaging device 10c are equalized, and each of the imaging scanning periods of the respective imaging devices 10a, 10b, and 10c is set to the maximum. FIG. 16 illustrates no image processing time of the processing device or the like.

Assume that f[s/frame] is a display scanning time per one frame, and k is the number of imaging devices (k=3 in the example illustrated in FIG. 16). In this case, the maximum value of the total of the imaging scanning periods of the respective imaging devices per one frame according to the present embodiment is expressed by ((k−1)/k)*2*f[s]. The maximum value of the imaging scanning period of each imaging device per one frame is expressed by (((k−1)/k)*2*f)/k[s]. The maximum value of a display delay time of the display device 20 is expressed by ((k−1)/k)*f[s].

If the number of imaging devices is 2, the maximum value of the imaging scanning period of each imaging device per one frame is (½)*f[s], which is equivalent to that of the imaging display system 1a according to the second embodiment. The maximum value of the display delay time of the display device 20 is also (½)*f[s].

If the number of imaging devices is 3, the maximum value of the imaging scanning periods of each imaging device per one frame is (4/9)*f[s]. If the number of imaging devices is 4, the maximum value of the imaging scanning periods of each imaging device per one frame is (3/8)*f[s]. As described above, the imaging display system according to the modification of the third embodiment including three or more imaging devices can reduce effect on the imaging time per one frame of the imaging device along with the increase in the number of imaging devices as compared with the imaging display system 1a according to the second embodiment. As a result, the imaging display system can reduce restrictions on the increase in the display frame rate of the display device 20.

As described above, the imaging display systems 1b and 1c according to the third embodiment each include buffer memories that store therein image data output from respective image sensors included in the imaging devices during imaging scanning periods of the respective imaging devices. The imaging display systems 1b and 1c display one image using images taken by the imaging devices and read from the buffer memories. By using memories that enable simultaneous writing and reading of data as the buffer memories, the imaging display systems 1b and 1c can reduce effects on the imaging time per one frame of the imaging devices along with the increase in the number of imaging devices as compared with the imaging display system 1a according to the second embodiment. As a result, the imaging display systems 1b and 1c can reduce restrictions on the increase in the display frame rate of the display device 20.

Even in a configuration that does not use dual-port memories or FIFO memories that enable simultaneous writing and reading of data as the buffer memories, the imaging display systems 1b and 1c including three or more imaging devices can reduce effects on the imaging time per one frame of the imaging devices, which is caused by the increase in the number of imaging devices, as compared with the imaging display system 1a according to the second embodiment. As a result, the imaging display systems 1b and 1c can reduce restrictions on the increase in the display frame rate of the display device 20.

Fourth Embodiment

Figure 17:
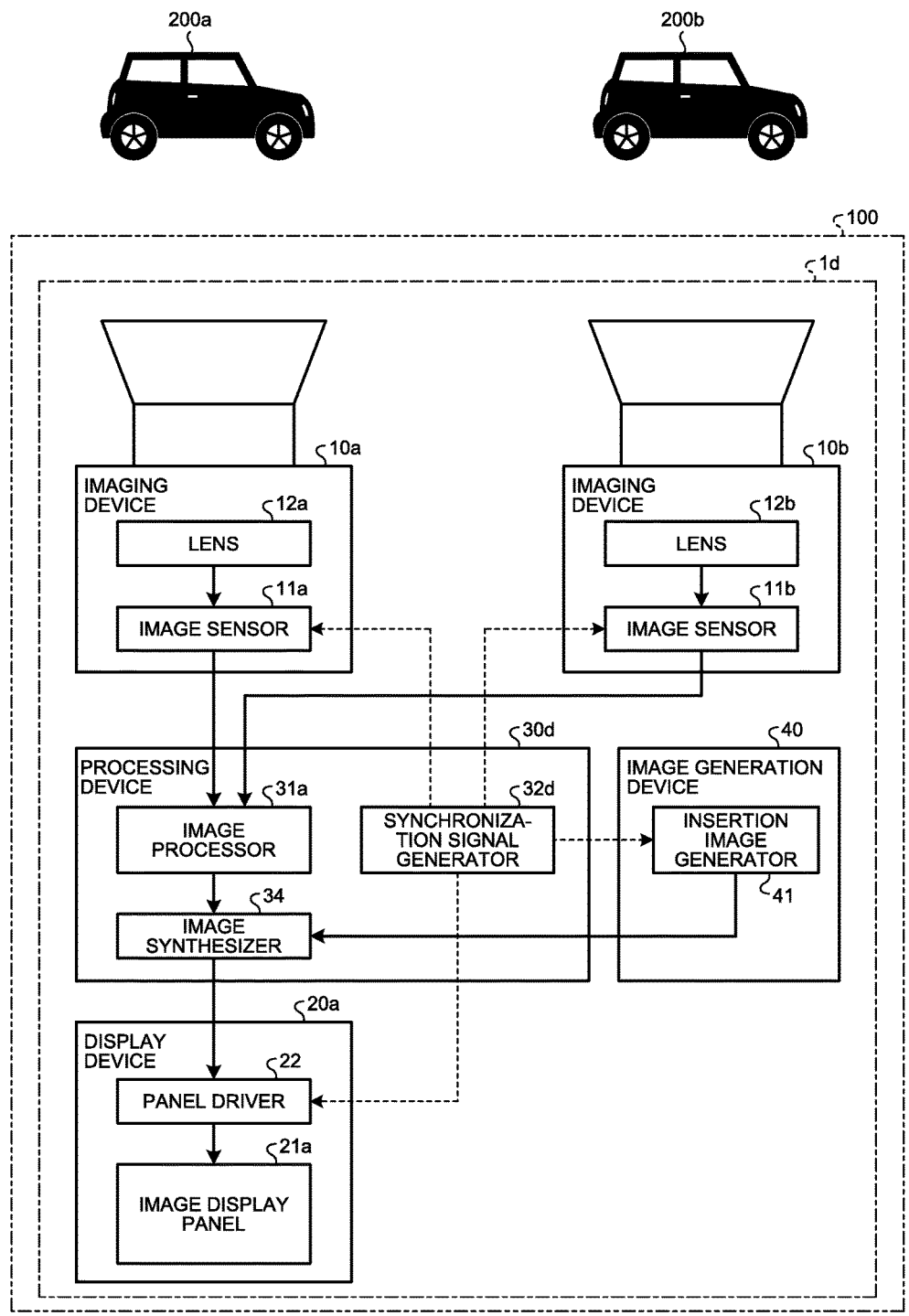
FIG. 17 is a block diagram of an exemplary schematic configuration of an imaging display system according to a fourth embodiment of the present invention.

FIG. 17 is a block diagram of an exemplary schematic configuration of an imaging display system 1d according to a fourth embodiment of the present invention. The same components as those described in the embodiments above are denoted by the same reference numerals, and overlapping explanation thereof is omitted.

In the imaging display system 1d according to the present embodiment, the imaging device 10a is arranged on the left side surface of the car 100, and the imaging device 10b is arranged on the right side surface of the car 100, for example. The imaging device 10a takes an image (vehicle 200a in the example illustrated in FIG. 17) on the left side or the left rear side of the car 100. The imaging device 10b takes an image (vehicle 200b in the example illustrated in FIG. 17) on the right side or the right rear side of the car 100. In other words, the imaging devices 10a and 10b are arranged at symmetrical positions with respect to the moving direction of the car 100 serving as a movable body.

An image generation device 40 is a computer mounted on the car 100, for example, and includes an insertion image generator 41. The insertion image generator 41 generates images of gauges, such as a speedometer and a tachometer, of the car 100 and images including information required for driving, such as navigation images, as insertion images to be displayed on a display device 20a together with the images taken by the imaging devices 10a and 10b.

A processing device 30d includes the image processor 31a, a synchronization signal generator 32d, and an image synthesizer 34. The image synthesizer 34 synthesizes the images taken by the imaging devices 10a and 10b and output from the image processor 31a with the insertion image generated by the image generation device 40 and outputs the synthesized image to the display device 20a. The synchronization signal generator 32d will be described later.

Figure 18:
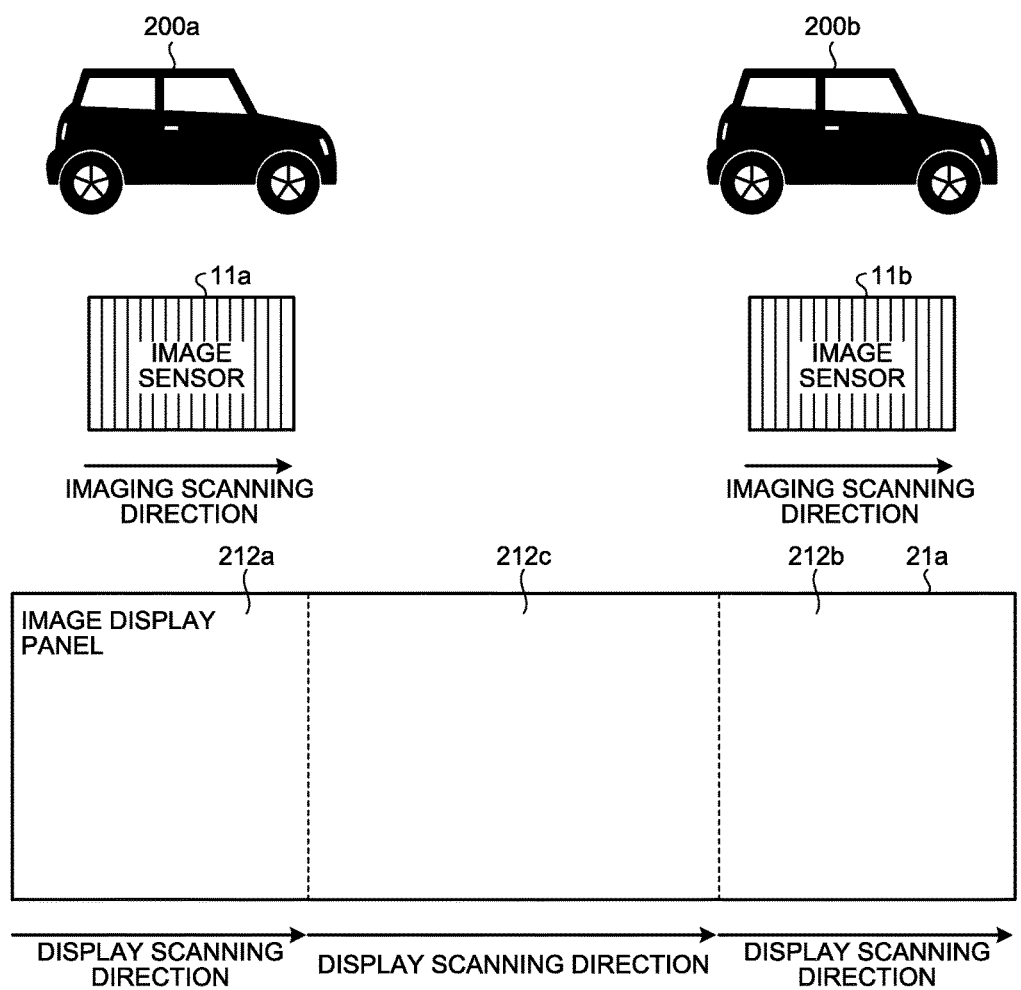
FIG. 18 is a diagram of an example of a display image displayed by the imaging display system according to the fourth embodiment.

FIG. 18 is a diagram of an example of a display image displayed by the imaging display system according to the fourth embodiment. An image display panel 21a has a plurality of (three in the present embodiment) display areas 212a, 212b, and 212c. The display area 212a displays an image taken by the imaging device 10a. The display area 212b displays an image taken by the imaging device 10b. The display area 212c displays an insertion image generated by the image generation device 40. The imaging scanning direction of the image sensor 11a, the imaging scanning direction of the image sensor 11b, the display scanning direction in the display area 212a, the display scanning direction in the display area 212b, and the display scanning direction in the display area 212c according to the present embodiment are the same direction (direction from left to right in the example illustrated in FIG. 18). In other words, the direction of components parallel to the moving direction of the car 100 in the imaging scanning direction of the image on the image sensor 11a of the imaging device 10a arranged on the left side surface of the car 100, for example, is opposite to the direction of components parallel to the moving direction of the car 100 in the imaging scanning direction of the image on the image sensor 11b of the imaging device 10b arranged on the right side surface of the car 100.

Figure 19:
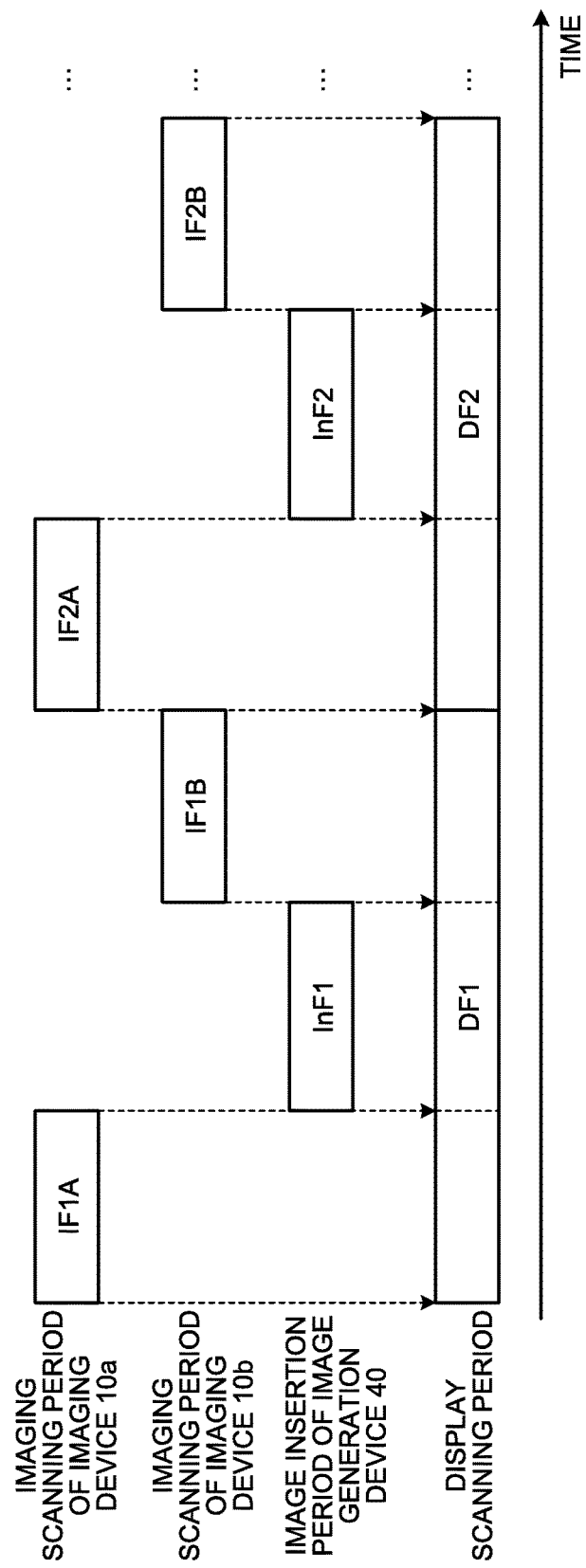
FIG. 19 is a diagram illustrating an example of a timing chart of the imaging scanning periods, image insertion periods, and the display scanning periods of the imaging display system according to the fourth embodiment.

FIG. 19 is a diagram illustrating an example of a timing chart of the imaging scanning periods, image insertion periods, and the display scanning periods of the imaging display system according to the fourth embodiment. FIG. 19 schematically illustrates an example of the relation between the imaging scanning periods IF1A, IF2A, . . . of the imaging device 10a, the imaging scanning periods IF1B, IF2B, . . . of the imaging device 10b, image insertion periods InF1, InF2, . . . of the image generation device 40, and the display scanning periods DF1, DF2, . . . of the display device 20a.

FIG. 19 illustrates no image processing time of the image processor 31a or the like in the processing device 30d.

The synchronization signal generator 32d of the processing device 30d according to the present embodiment generates and outputs synchronization signals to the imaging device 10a, the imaging device 10b, the image generation device 40, and the display device 20a so as to form the display scanning period in which an image taken by the imaging device 10a, an image generated by the image generation device 40, and an image taken by the imaging device 10b are successively displayed in order of the scanning directions illustrated in FIG. 18. As a result, the image taken by the imaging device 10a and the image taken by the imaging device 10b are displayed on the image display panel 21a in a manner arranged in time series with the image generated by the image generation device 40 interposed therebetween.

While the insertion image generated by the image generation device 40 is displayed between the image taken by the imaging device 10a and the image taken by the imaging device 10b, that is, at the center in the horizontal direction of the image display panel 21a in the example described above, the display position of the insertion image is not limited thereto. The insertion image may be displayed at one end or the other end in the horizontal direction of the image display panel 21a, for example, and the image taken by the imaging device 10a and the image taken by the imaging device 10b may be displayed adjacent to each other. Alternatively, no insertion image may be displayed, and the image taken by the imaging device 10a and the image taken by the imaging device 10b may be displayed side by side.

As described above, the imaging display system 1d according to the fourth embodiment includes the imaging devices 10a and 10b arranged at symmetrical positions with respect to the moving direction of the car 100 serving as a movable body. With this configuration, the imaging display system 1d can display the image taken by the imaging device 10a and the image taken by the imaging device 10b in a manner arranged in time series.

The imaging display system 1d further displays images of gauges, such as a speedometer and a tachometer, of the car 100 and images including information required for driving, such as navigation images, on the display device 20a together with the images taken by the imaging devices 10a and 10b. Consequently, the imaging display system 1d can increase the amount of information displayed on the display device 20a.

Fifth Embodiment

Figure 20:
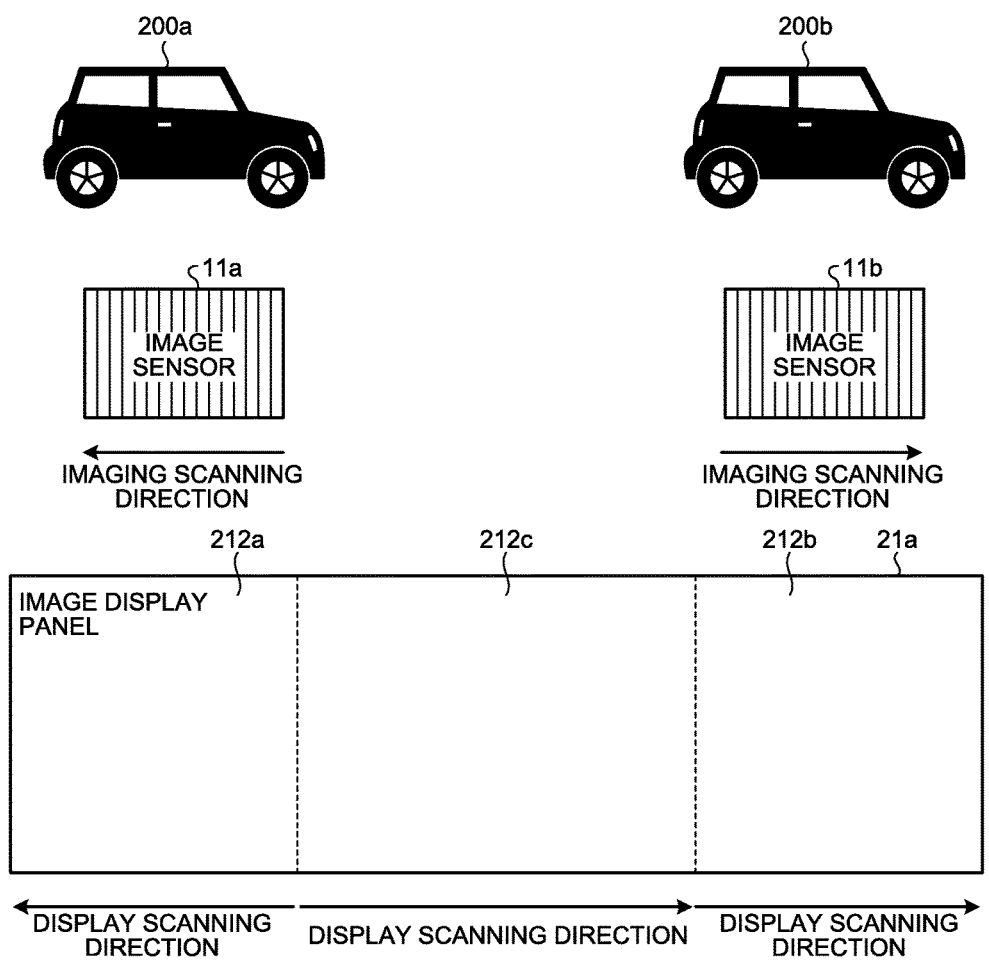
FIG. 20 is a diagram of an example of a display image displayed by an imaging display system according to a fifth embodiment of the present invention.

FIG. 20 is a diagram of an example of a display image displayed by an imaging display system 1e according to a fifth embodiment of the present invention. The present embodiment is the same as the fourth embodiment in that the display area of the image display panel 21a is composed of the three display areas 212a, 212b, and 212c. The present embodiment is different from the fourth embodiment in that the imaging scanning direction of the image sensor 11a and the display scanning direction in the display area 212a are different from the imaging scanning direction of the image sensor 11b, the display scanning direction in the display area 212b, and the display scanning direction in the display area 212c. The present embodiment is the same as the fourth embodiment in that images for the display areas 212a, 212b, and 212c are displayed in arrangement order of the display areas 212a, 212b, and 212c on the image display panel 21a.

As described in the fourth embodiment, the direction of components parallel to the moving direction of the car 100 in the imaging scanning direction of the image on the image sensor 11a of the imaging device 10a arranged on the left side surface of the car 100, for example, is opposite to the direction of components parallel to the moving direction of the car 100 in the imaging scanning direction of the image on the image sensor 11b of the imaging device 10b arranged on the right side surface of the car 100. In this case, expansion and contraction directions in a scenery image on the left side or the left rear side of the car 100 taken by the imaging device 10a are opposite to those in a scenery image on the right side or the right rear side of the car 100 taken by the imaging device 10b, for example, thereby causing a feeling of strangeness.

As illustrated in FIG. 20, the imaging scanning direction of the image sensor 11a and the display scanning direction in the display area 212a coincide with each other, and are opposite to the imaging scanning direction of the image sensor 11b and the display scanning direction in the display area 212b. With this configuration, the direction of components parallel to the moving direction of the car 100 in the imaging scanning direction of the image on the image sensor 11a of the imaging device 10a arranged on the left side surface of the car 100, for example, coincides with the direction of components parallel to the moving direction of the car 100 in the imaging scanning direction of the image on the image sensor 11b of the imaging device 10b arranged on the right side surface of the car 100. Consequently, the present embodiment can prevent the expansion and contraction directions in the image taken by the imaging device 10a from being opposite to those in the image taken by the imaging device 10b.

Figure 21:
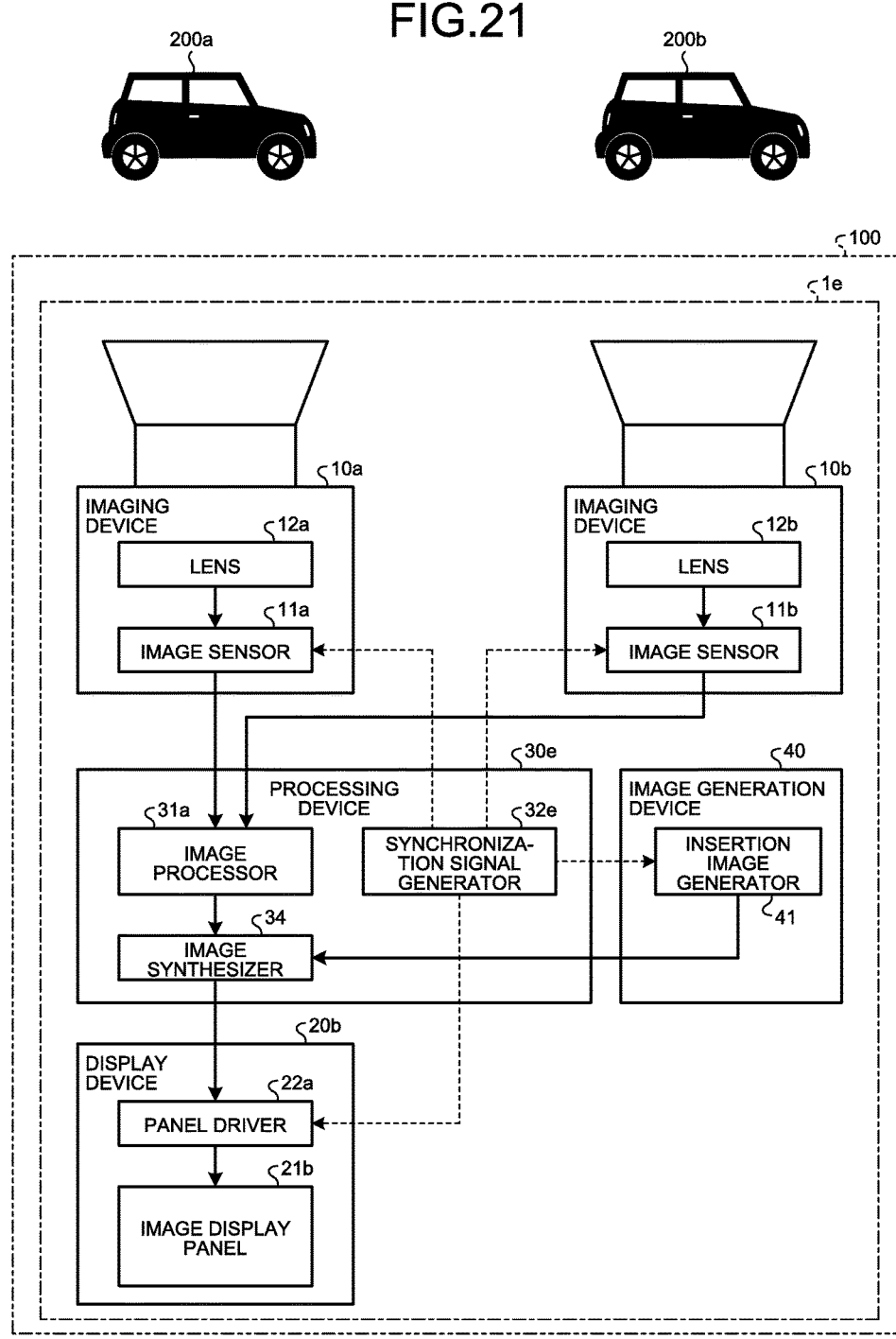
FIG. 21 is a block diagram of an exemplary schematic configuration of the imaging display system according to the fifth embodiment.
Figure 22:
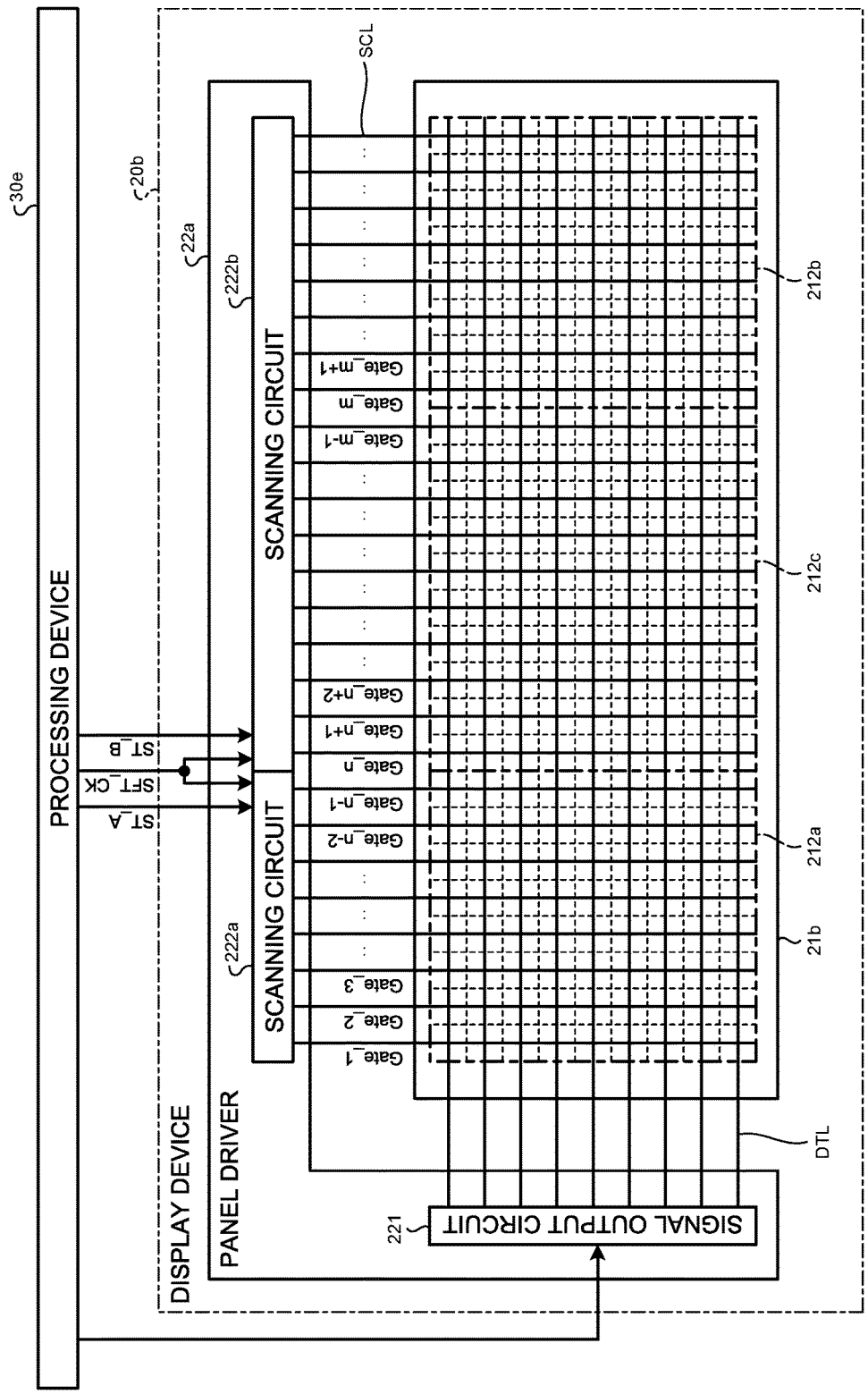
FIG. 22 is a block diagram of an exemplary configuration of a display device of the imaging display system according to the fifth embodiment.

FIG. 21 is a block diagram of an exemplary schematic configuration of the imaging display system 1e according to the fifth embodiment. FIG. 22 is a block diagram of an exemplary configuration of a display device of the imaging display system according to the fifth embodiment. The same components as those described in the embodiments above are denoted by the same reference numerals, and overlapping explanation thereof is omitted.

A panel driver 22a of a display device 20b includes the signal output circuit 221 and scanning circuits 222a and 222b.

The signal output circuit 221 is a source driver and electrically coupled to an image display panel 21b via the signal lines DTL. The signal output circuit 221 generates video signals to be output to the respective pixel rows via the signal lines DTL based on image data output from an processing device 30e (image synthesizer 34).

The scanning circuits 222a and 222b are gate drivers and include a shift register and a buffer, for example. The scanning circuits 222a and 222b are electrically coupled to the image display panel 21b via the scanning lines SCL.

The scanning circuit 222a generates scanning signals (Gate_1, Gate_2, Gate_3, . . . , Gate_n−2, and Gate_n−1) to be output to the respective pixel columns in the display area 212a via the scanning lines SCL in response to shift clocks (SFT_CK) and start pulses (ST_A) serving as synchronization signals output from the processing device 30e (synchronization signal generator 32e).

The scanning circuit 222b generates scanning signals (Gate_n, Gate_n+1, Gate_n+2, . . . , Gate_m−1, Gate_m, Gate_m+1, . . . ) to be output to the respective pixel columns in the display areas 212b and 212c via the scanning lines SCL in response to shift clocks (SFT_CK) and start pulses (ST_B) output from the processing device 30e (synchronization signal generator 32e).

Figure 23:
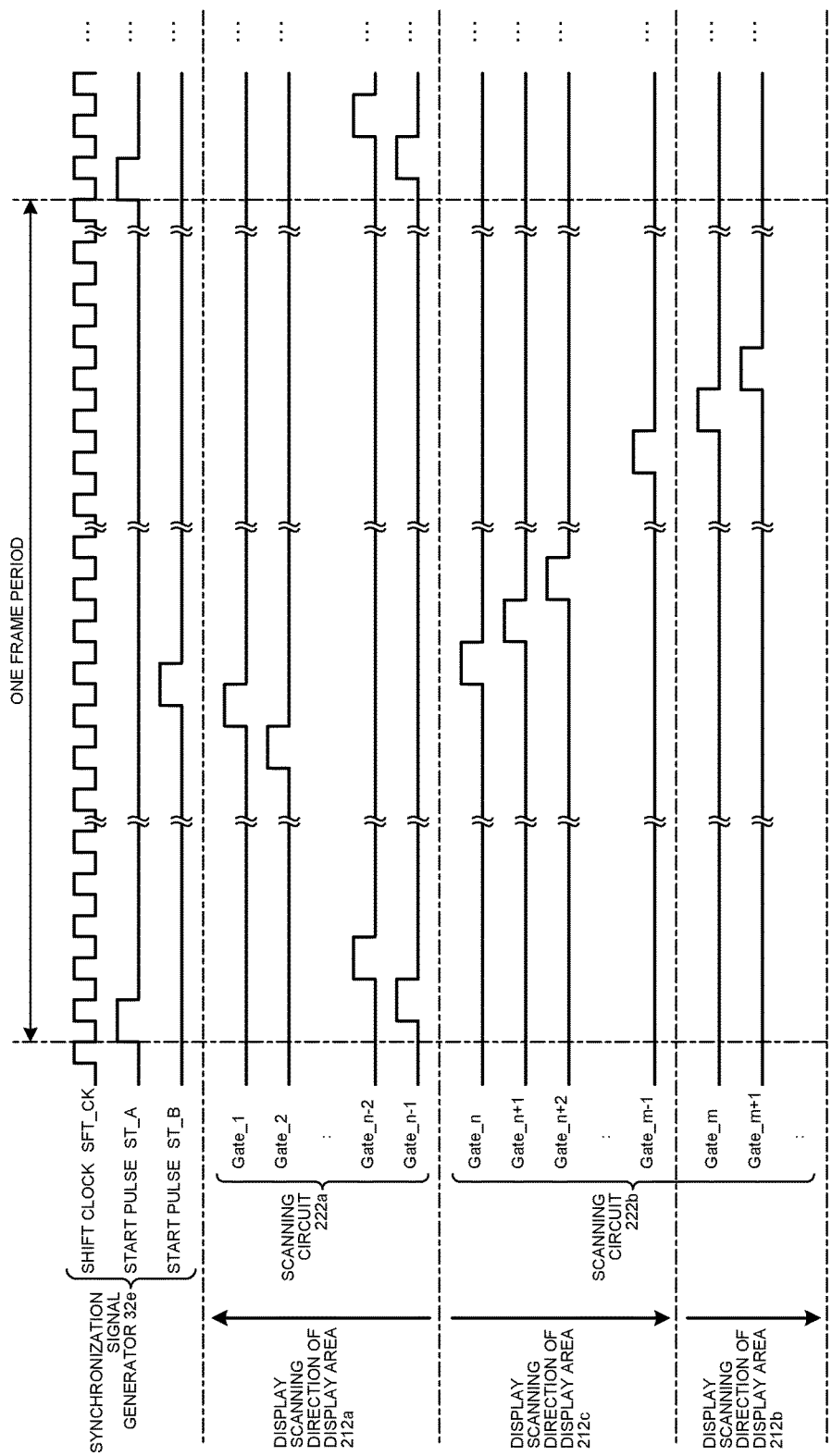
FIG. 23 is a diagram of an example of a timing chart of synchronization signals and scanning signals in the imaging display system according to the fifth embodiment.

FIG. 23 is a diagram of an example of a timing chart of the synchronization signals and the scanning signals in the imaging display system according to the fifth embodiment.

When the synchronization signal generator 32e outputs the start pulse ST_A, the scanning circuit 222a sequentially outputs the scanning signals Gate_n−1, Gate_n−2, . . . , Gate_2, and Gate_1 while shifting the scanning lines SCL in synchronization with the shift clocks SFT_CK. As a result, an image is displayed on the display area 212a with the imaging scanning direction of the image sensor 11a coinciding with the display scanning direction in the display area 212a on the image display panel 21b.

Subsequently, when the synchronization signal generator 32e outputs the start pulse ST_B, the scanning circuit 222b sequentially outputs the scanning signals Gate_n, Gate_n+1, Gate_n+2, . . . , and Gate_m−1 while shifting the scanning lines SCL in synchronization with the shift clocks SFT_CK. As a result, an image is displayed on the display area 212c.

Subsequently, the scanning circuit 222b sequentially outputs the scanning signals Gate_m, Gate_m+1 . . . while shifting the scanning lines SCL in synchronization with the shift clocks SFT_CK. As a result, an image is displayed on the display area 212b with the imaging scanning direction of the image sensor 11b coinciding with the display scanning direction in the display area 212b on the image display panel 21b.

With the procedure described above, an image of one frame is displayed on the image display panel 21b. As a result, the image taken by the imaging device 10a and the image taken by the imaging device 10b are displayed on the image display panel 21b in a manner arranged in time series with the image generated by the image generation device 40 interposed therebetween.

While the insertion image generated by the image generation device 40 is displayed between the image taken by the imaging device 10a and the image taken by the imaging device 10b, that is, at the center in the horizontal direction of the image display panel 21b in the example described above, the display position of the insertion image is not limited thereto. The insertion image may be displayed at one end or the other end in the horizontal direction of the image display panel 21b, for example, and the image taken by the imaging device 10a and the image taken by the imaging device 10b may be displayed adjacent to each other. Alternatively, no insertion image may be displayed, and the image taken by the imaging device 10a and the image taken by the imaging device 10b may be displayed side by side.

As described above, in an imaging display system 1e according to the fifth embodiment, the direction of components parallel to the moving direction of the car 100 in the imaging scanning direction of the image on the image sensor 11a of the imaging device 10a coincides with the direction of components parallel to the moving direction of the car 100 in the imaging scanning direction of the image on the image sensor 11b of the imaging device 10b. Further, in the imaging display system 1e, the imaging scanning direction of the image sensor 11a coincides with the display scanning direction in the display area 212a on the image display panel 21b, and the imaging scanning direction of the image sensor 11b coincides with the display scanning direction in the display area 212b on the image display panel 21b. Consequently, the present embodiment can prevent the expansion and contraction directions in the image taken by the imaging device 10a from being opposite to those in the image taken by the imaging device 10b.

Sixth Embodiment

Figure 24:
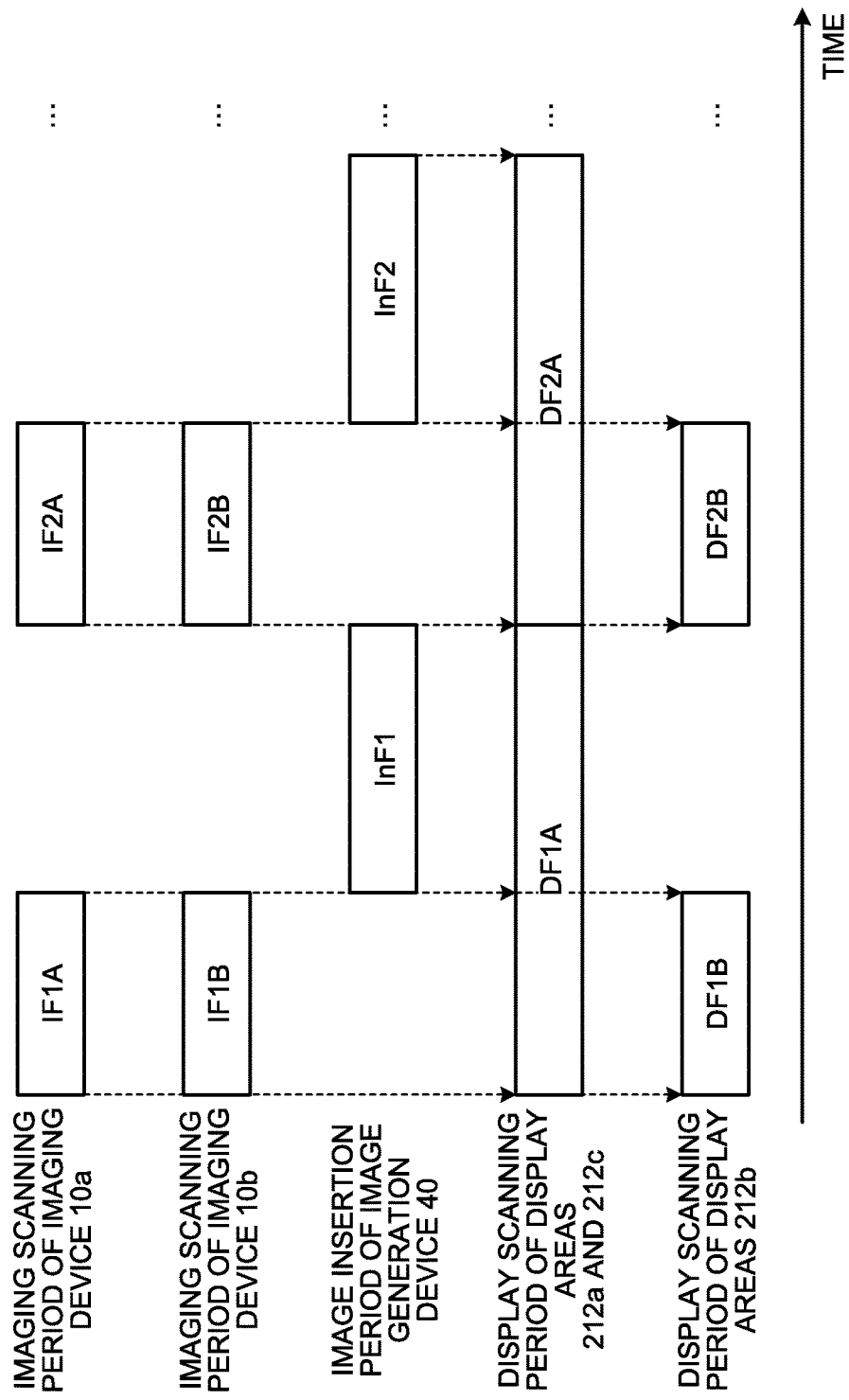
FIG. 24 is a diagram of an example of a timing chart of the imaging scanning periods, the image insertion periods, and the display scanning periods of the imaging display system according to a sixth embodiment of the present invention.
Figure 25:
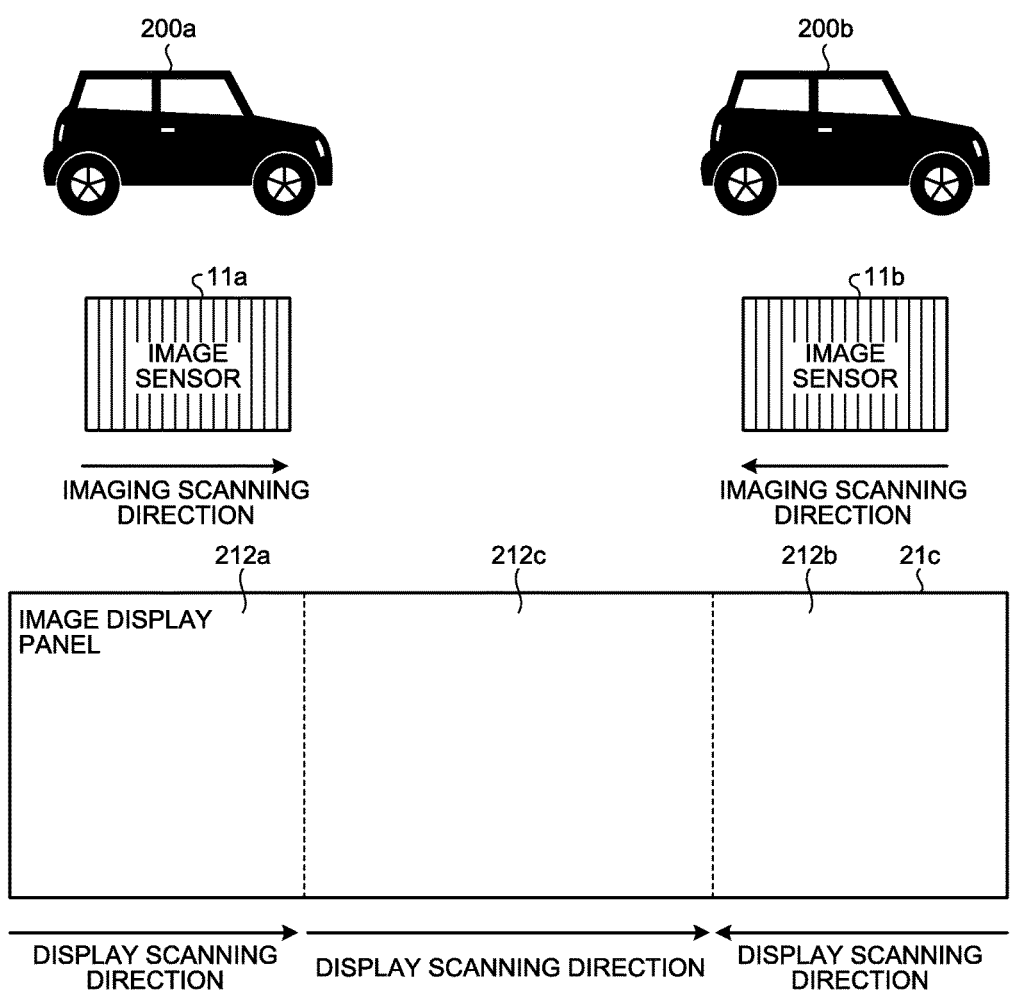
FIG. 25 is a diagram of an example of a display image displayed by the imaging display system according to the sixth embodiment.
Figure 26:
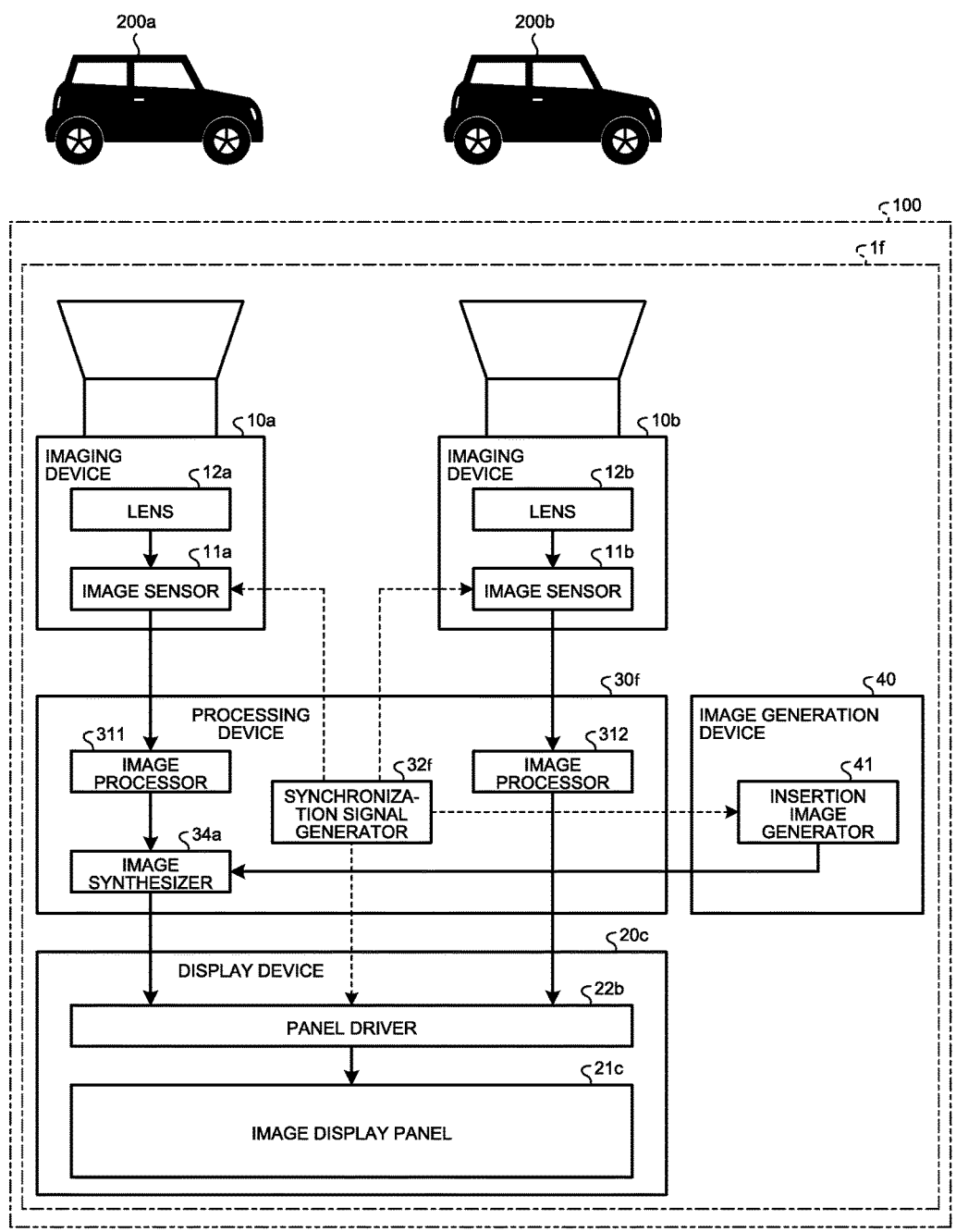
FIG. 26 is a block diagram illustrating an exemplary schematic configuration of the imaging display system according to the sixth embodiment.
Figure 27:
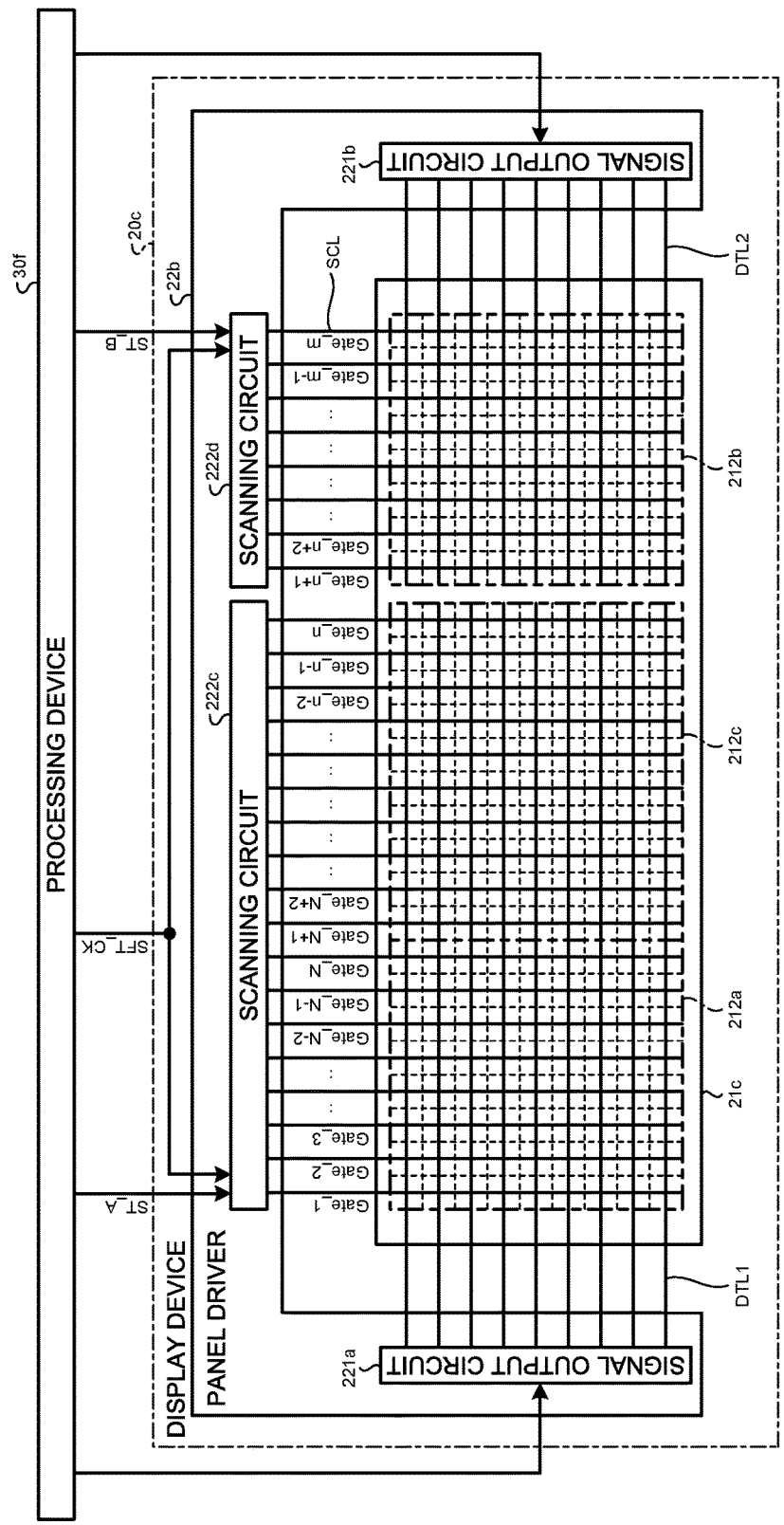
FIG. 27 is a block diagram of an exemplary configuration of a display device of the imaging display system according to the sixth embodiment.
Figure 28:
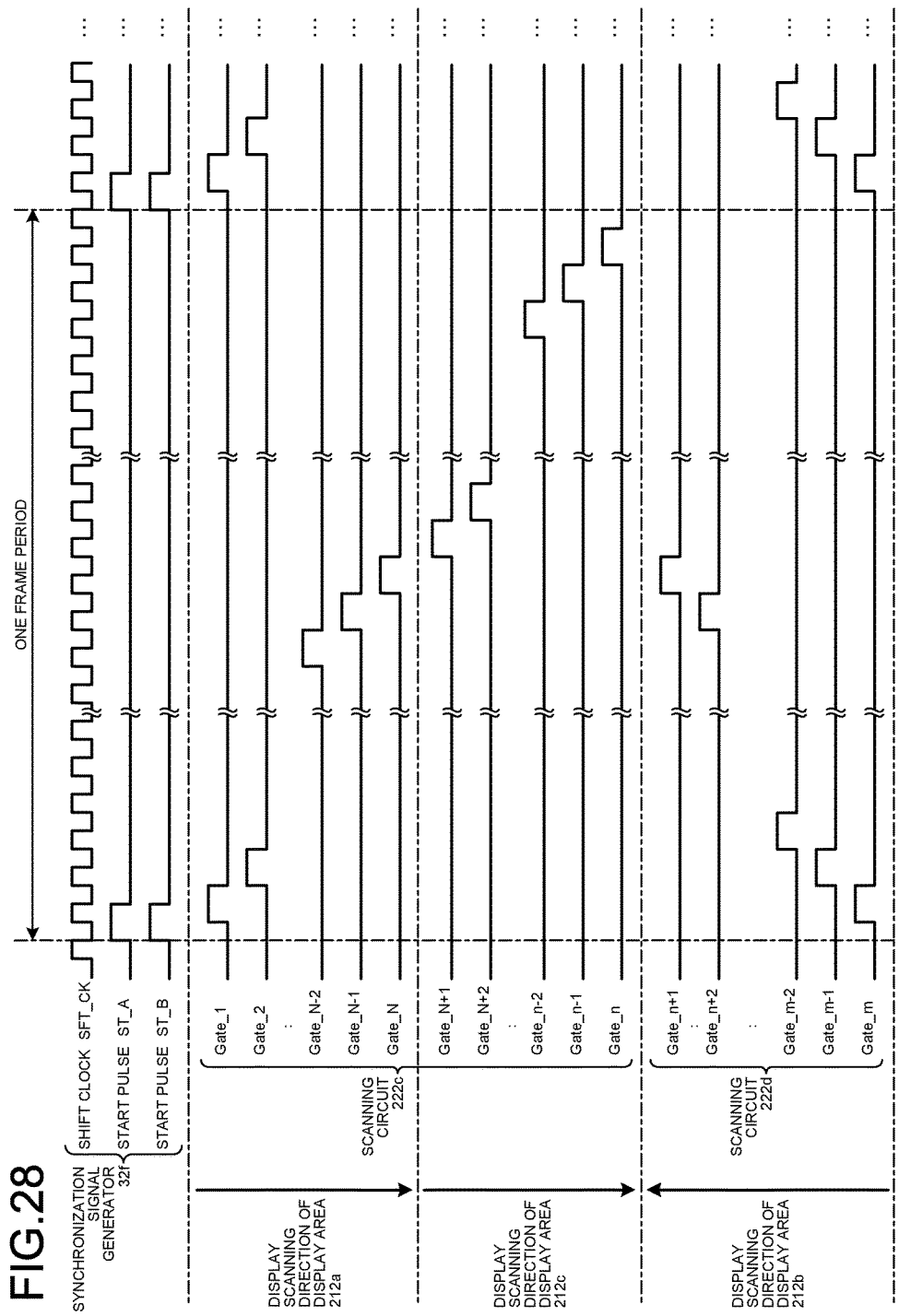
FIG. 28 is a diagram illustrating an example of a timing chart of the synchronization signals and the scanning signals in the imaging display system according to the sixth embodiment.

FIG. 24 is a diagram of an example of a timing chart of the imaging scanning periods, the image insertion periods, and the display scanning periods of an imaging display system 1f according to a sixth embodiment of the present invention. FIG. 25 is a diagram of an example of a display image displayed by the imaging display system 1f according to the sixth embodiment. FIG. 26 is a block diagram illustrating an exemplary schematic configuration of the imaging display system 1f according to the sixth embodiment. FIG. 27 is a block diagram of an exemplary configuration of a display device 20C of the imaging display system 1f according to the sixth embodiment. FIG. 28 is a diagram illustrating an example of a timing chart of the synchronization signals and the scanning signals in the imaging display system 1f according to the sixth embodiment. The same components as those described in the embodiments above are denoted by the same reference numerals, and overlapping explanation thereof is omitted. The example illustrated in FIG. 24 schematically illustrates the relation between the imaging scanning periods IF1A, IF2A, . . . of the imaging device 10a, the imaging scanning periods IF1B, IF2B, . . . of the imaging device 10b, the image insertion periods InF1, InF2, . . . of the image generation device 40, display scanning periods DF1A, DF2A, . . . in the display areas 212a and 212c of the display device 20c, and display scanning periods DF1B, DF2B, . . . in the display area 212b of the display device 20c. FIG. 24 illustrates no image processing time of image processors 311 and 312 or the like in a processing device 30f.

The present embodiment is the same as the fourth and the fifth embodiments in that the display area of an image display panel 21c is composed of the three display areas 212a, 212b, and 212c. The present embodiment is the same as the fifth embodiment in that the imaging scanning direction of the image sensor 11a and the display scanning direction in the display area 212a are different from the imaging scanning direction of the image sensor 11b and the display scanning direction in the display area 212b. The fourth and the fifth embodiments have described an example where an image is displayed in time series in arrangement order of the display areas 212a, 212b, and 212c on the image display panel. The sixth embodiment describes an example where the imaging devices 10a and 10b take an image simultaneously and where the image taken by the imaging device 10a and the image taken by the imaging device 10b are displayed side by side simultaneously.

As illustrated in FIG. 24, the imaging scanning period of the imaging device 10a is synchronous with the imaging scanning period of the imaging device 10b, and the display scanning period of the display area 212a is synchronous with the display scanning period of the display area 212b. With this configuration, the image taken by the imaging device 10a and the image taken by the imaging device 10b can be displayed simultaneously.

As illustrated in FIG. 26, the processing device 30f includes the image processor 311, the image processor 312, a synchronization signal generator 32f, and an image synthesizer 34a. The image processor 311 performs, on image data output from the image sensor 11a, image processing for displaying an image taken by the image sensor 11a on the display device 20c. The image processor 312 performs, on image data output from the image sensor 11b, image processing for displaying an image taken by the image sensor 11b on the display device 20c and outputs the image data to the display device 20c. The image synthesizer 34a synthesizes the image that is taken by the imaging device 10a and output from the image processor 311 with the insertion image that is generated by the image generation device 40, and outputs the synthesized image to the display device 20*c*. The synchronization signal generator 32*f* will be described later.

As illustrated in FIG. 27, a panel driver 22*b* includes signal output circuits 221*a* and 221*b* and scanning circuits 222*c* and 222*d*.

The signal output circuits 221*a* and 221*b* are source drivers. The signal output circuit 221*a* is electrically coupled to the image display panel 21*c* via signal lines DTL1. The signal output circuit 221*a* generates video signals to be output to the respective pixel rows via the signal lines DTL1 based on image data output from the processing device 30*f* (image synthesizer 34*a*), the image data being obtained by synthesizing the image taken by the imaging device 10*a* and the insertion image generated by the image generation device 40. The signal output circuit 221*b* is electrically coupled to the image display panel 21*c* via signal lines DTL2. The signal output circuit 221*b* generates video signals to be output to the respective pixel rows via the signal lines DTL2 based on image data of the image taken by the imaging device 10*b* and output from the processing device 30*f* (image processor 312).

The scanning circuits 222*c* and 222*d* are gate drivers and include a shift register and a buffer, for example. The scanning circuits 222*c* and 222*d* are electrically coupled to the image display panel 21*c* via the scanning lines SCL.

The scanning circuit 222*c* generates scanning signals (Gate_1, Gate_2, Gate_3, . . . , Gate_N−2, Gate_N−1, Gate_N, Gate_N+1, Gate_N+2, . . . , Gate_n−2, Gate_n−1, and Gate_n) to be output to the respective pixel columns in the display areas 212*a* and 212*c* via the scanning lines SCL in response to the shift clocks (SFT_CK) and the start pulses (ST_A) serving as synchronization signals output from the processing device 30*f* (synchronization signal generator 32*f*).

The scanning circuit 222*b* generates scanning signals (Gate_n+1, Gate_n+2, . . . , Gate_m−1, and Gate_m) to be output to the respective pixel columns in the display areas 212*b* via the scanning lines SCL in response to the shift clocks (SFT_CK) and the start pulses (ST_B) output from the processing device 30*f* (synchronization signal generator 32*f*).

As illustrated in FIG. 28, when the synchronization signal generator 32*f* outputs the start pulse ST_A, the scanning circuit 222*c* sequentially outputs the scanning signals Gate_1, Gate_2, Gate_3, . . . , Gate_N−2, Gate_N−1, and Gate_N while shifting the scanning lines SCL in synchronization with the shift clocks SFT_CK. As a result, an image is displayed on the display area 212*a* with the imaging scanning direction of the image sensor 11*a* coinciding with the display scanning direction in the display area 212*a* on the image display panel 21*c*. Subsequently, the scanning circuit 222*c* sequentially outputs the scanning signals Gate_N+1, . . . , Gate_n−2, Gate_n−1, and Gate_n while shifting the scanning lines SCL. As a result, an image is displayed on the display area 212*c*.

When the synchronization signal generator 32*f* outputs the start pulse ST_B simultaneously with output of the start pulse ST_A, the scanning circuit 222*d* sequentially outputs the scanning signals Gate_n+1, Gate_n+2, . . . , Gate_m−1, and Gate_m while shifting the scanning lines SCL in synchronization with the shift clocks SFT_CK. As a result, an image is displayed on the display area 212*b*.

With the procedure described above, an image of one frame is displayed on the image display panel 21*c*. As a result, the image taken by the imaging device 10*a* and the image taken by the imaging device 10*b* are displayed simultaneously, and the image generated by the image generation device 40 is then displayed.

Figure 29:
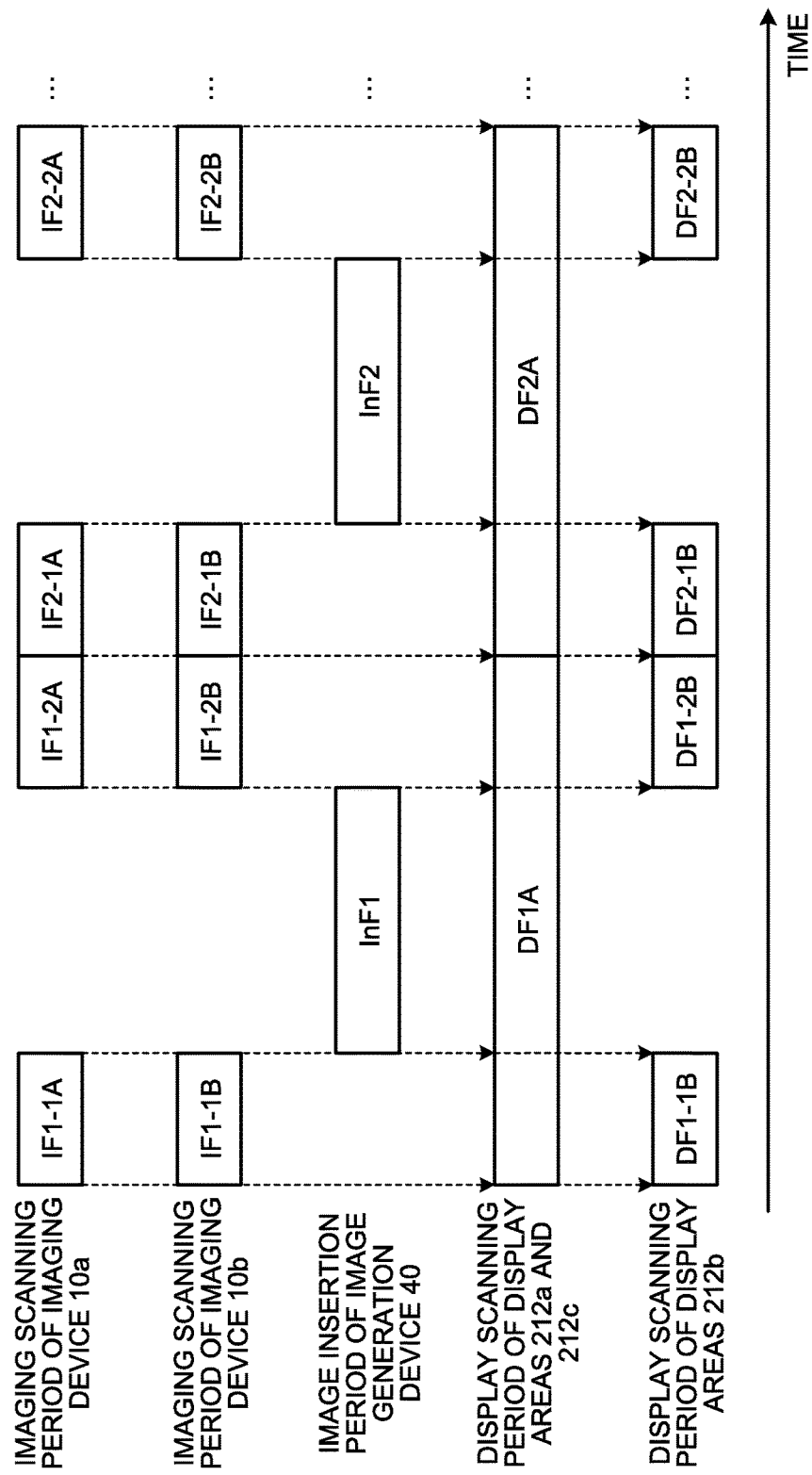
FIG. 29 is a diagram illustrating an example of a timing chart of the imaging scanning periods, the image insertion periods, and the display scanning periods of an imaging display system according to a modification of the sixth embodiment.

FIG. 29 is a diagram illustrating an example of a timing chart of the imaging scanning periods, the image insertion periods, and the display scanning periods of an imaging display system according to a modification of the sixth embodiment. The example illustrated in FIG. 29 schematically illustrates the relation between imaging scanning periods IF1-1A, IF1-2A, IF2-1A, IF2-2A, . . . of the imaging device 10*a*, imaging scanning periods IF1-1B, IF1-2B, IF2-1B, IF2-2B, . . . of the imaging device 10*b*, the image insertion periods InF1, InF2, . . . in the image generation device 40, the display scanning periods DF1A, DF2A, . . . in the display areas 212*a* and 212*c* of the display device 20*c*, and display scanning periods DF1-1B, DF1-2B, DF2-1B, DF2-2B, . . . in the display area 212*b* of the display device 20*c*. FIG. 29 illustrates no image processing time of the image processors 311 and 312 or the like in the processing device 30*f*.

In the modification of the sixth embodiment, the imaging devices 10*a* and 10*b* take an image a plurality of times while an image of one frame is displayed. FIG. 29 illustrates an example where the periods for displaying the images taken by the imaging devices 10*a* and 10*b* are arranged with the period for displaying the insertion image generated by the image generation device 40 interposed therebetween. With this configuration, the imaging display system 1*f* of the modification can display the images taken at a higher rate than that of the example illustrated in FIG. 24 if the display period of one frame is the same as that of the example illustrated in FIG. 24.

While the insertion image generated by the image generation device 40 is displayed between the image taken by the imaging device 10*a* and the image taken by the imaging device 10*b*, that is, at the center in the horizontal direction of the image display panel 21*c* in the example described above, the display position of the insertion image is not limited thereto. The insertion image may be displayed at one end or the other end in the horizontal direction of the image display panel 21*c*, for example, and the image taken by the imaging device 10*a* and the image taken by the imaging device 10*b* may be displayed adjacent to each other. Alternatively, no insertion image may be displayed, and the image taken by the imaging device 10*a* and the image taken by the imaging device 10*b* may be displayed side by side.

As described above, an imaging display system 1*f* according to the sixth embodiment causes the imaging scanning period of the imaging device 10*a* to be synchronous with the imaging scanning period of the imaging device 10*b*, and causes the display scanning period of the display area 212*a* for displaying the image taken by the imaging device 10*a* to be synchronous with the display scanning period of the display area 212*b* for displaying the image taken by the imaging device 10*b*. Consequently, the imaging display system 1*f* can display the image taken by the imaging device 10*a* and the image taken by the imaging device 10*b* simultaneously.

By causing the imaging devices 10*a* and 10*b* to take an image a plurality of times while an image of one frame is displayed, the imaging display system 1*f* can display the images taken at a higher rate.

Seventh Embodiment

Figure 30:
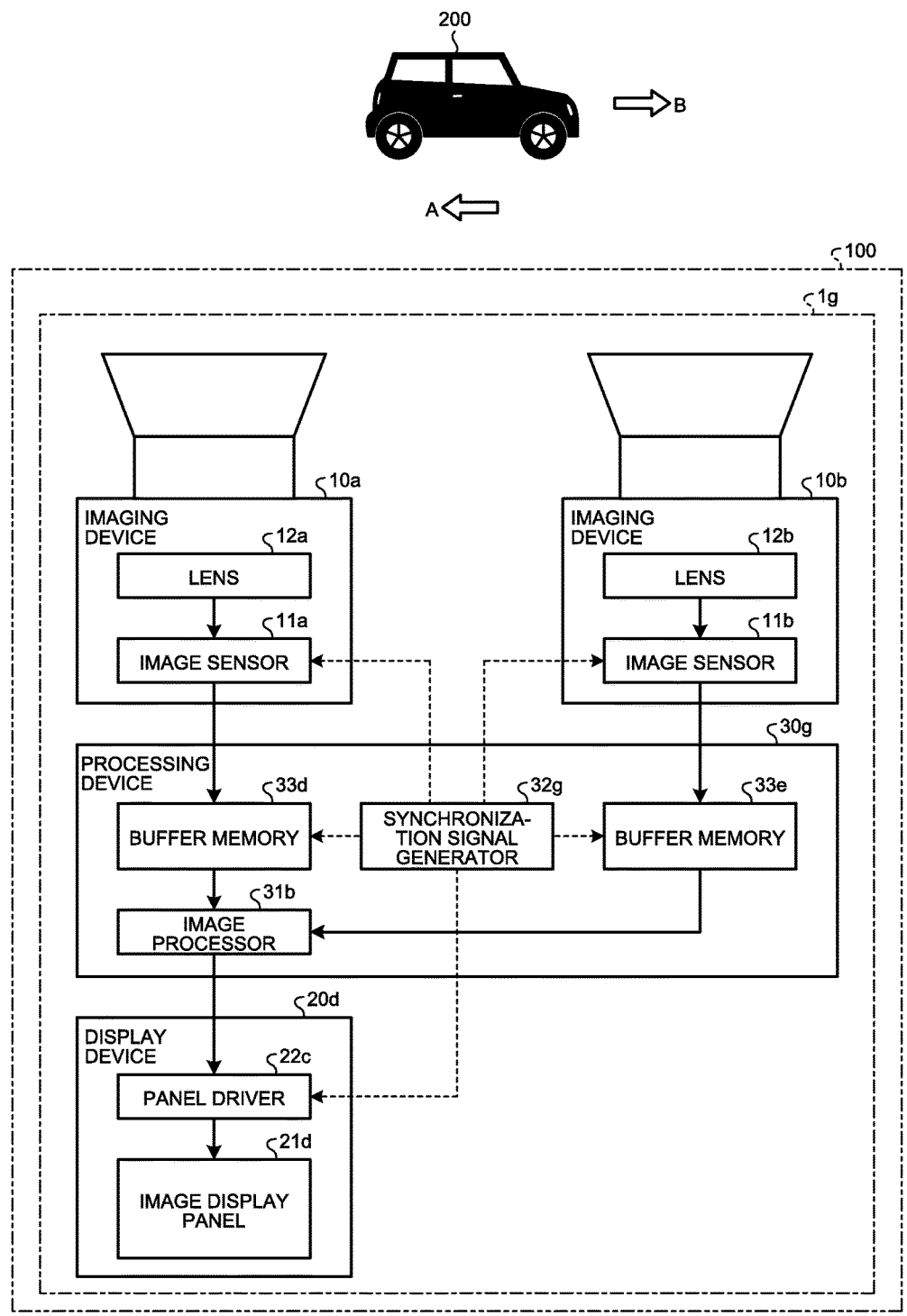
FIG. 30 is a block diagram of an exemplary schematic configuration of an imaging display system according to a seventh embodiment of the present invention.

FIG. 30 is a block diagram of an exemplary schematic configuration of an imaging display system 1*g* according to a seventh embodiment of the present invention. The same components as those described in the embodiments above are denoted by the same reference numerals, and overlapping explanation thereof is omitted.

As illustrated in FIG. 30, a processing device 30g of the imaging display system 1g according to the seventh embodiment includes the image processor 31b, a synchronization signal generator 32g, a buffer memory 33d, and a buffer memory 33e. The buffer memory 33d stores therein image data output from the image sensor 11a in each imaging scanning period of the imaging device 10a based on synchronization signals output from the synchronization signal generator 32g. The buffer memory 33b stores therein image data output from the image sensor 11b in each imaging scanning period of the imaging device 10b based on synchronization signals output from the synchronization signal generator 32g. The buffer memory 33d has two areas 1 and 2 so as to store therein image data of two frames taken by the imaging device 10a. The buffer memory 33e has two areas 1 and 2 so as to store therein image data of two frames taken by the imaging device 10b.

Similarly to the imaging display system 1a according to the second embodiment, the imaging display system 1g according to the present embodiment includes a plurality of (two in the present embodiment) imaging devices 10a and 10b arranged in the horizontal direction. With this configuration, the imaging display system 1g can make the angle of view of one imaging device narrower than that of the imaging display system 1 according to the first embodiment. Consequently, the imaging display system 1g can eliminate or reduce distortion in a subject image more than the imaging display system 1 according to the first embodiment does.

The image processor 31b performs image processing for displaying an image that is taken by the image sensor 11a and output from the buffer memory 33d and an image that is taken by the image sensor 11b and output from the buffer memory 33e in a manner arranged in the horizontal direction on a display device 20d. The synchronization signal generator 32g will be described later.

Figure 31:
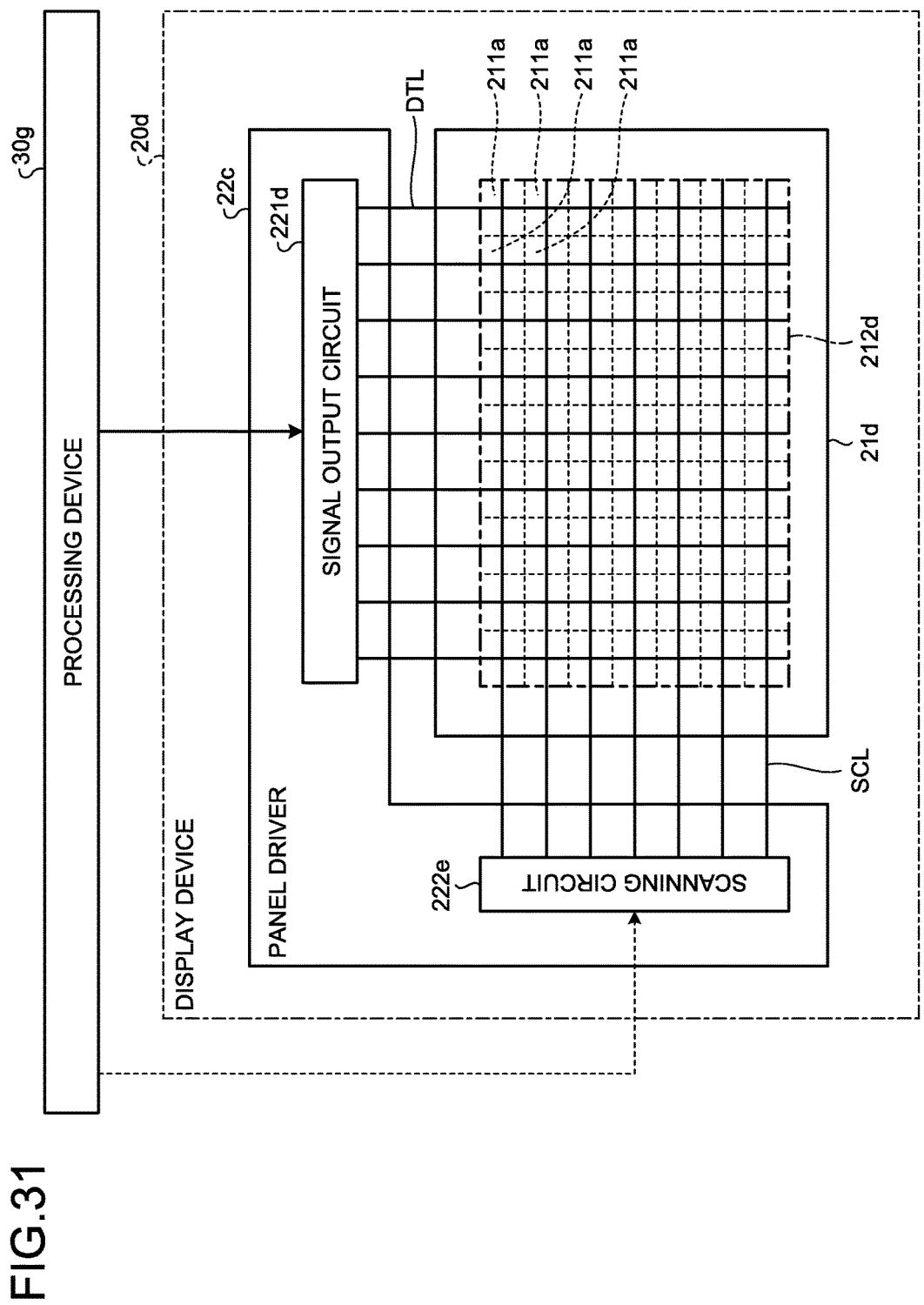
FIG. 31 is a block diagram of an exemplary configuration of a display device of the imaging display system according to the seventh embodiment.

The display device 20d is a color liquid crystal display device, for example, and includes an image display panel 21d and a panel driver 22c that controls driving of the image display panel 21d. The display device 20d is arranged on the center console of the car 100, for example. FIG. 31 is a block diagram of an exemplary configuration of the display device 20d of the imaging display system 1g according to the seventh embodiment.

As illustrated in FIG. 31, the image display panel 21d has a display area 212d in which a plurality of display pixels 211a are arrayed in the horizontal direction (row direction) and the vertical direction (column direction). In the description below, the row in which the display pixels 211a are aligned in the row direction is referred to as a pixel row, and the column in which the display pixels 211a are aligned in the column direction is referred to as a pixel column.

The panel driver 22c includes a signal output circuit 221d and a scanning circuit 222e.

The signal output circuit 221d is a source driver and electrically coupled to the image display panel 21d via the signal lines DTL. The signal output circuit 221d generates video signals for driving the display pixels 211a of the respective pixel columns based on image data output from the processing device 30g (image processor 31b). The signal output circuit 221d outputs the video signals to the respective pixel columns via the signal lines DTL.

The scanning circuit 222e is a gate driver and includes a shift register and a buffer, for example. The scanning circuit 222e is electrically coupled to the image display panel 21d via the scanning lines SCL. The scanning circuit 222e generates scanning signals based on synchronization signals including shift clocks and start pulses output from the processing device 30g (synchronization signal generator 32g). The scanning circuit 222e outputs the scanning signals to the respective pixel rows via the scanning lines SCL.

Figure 32:
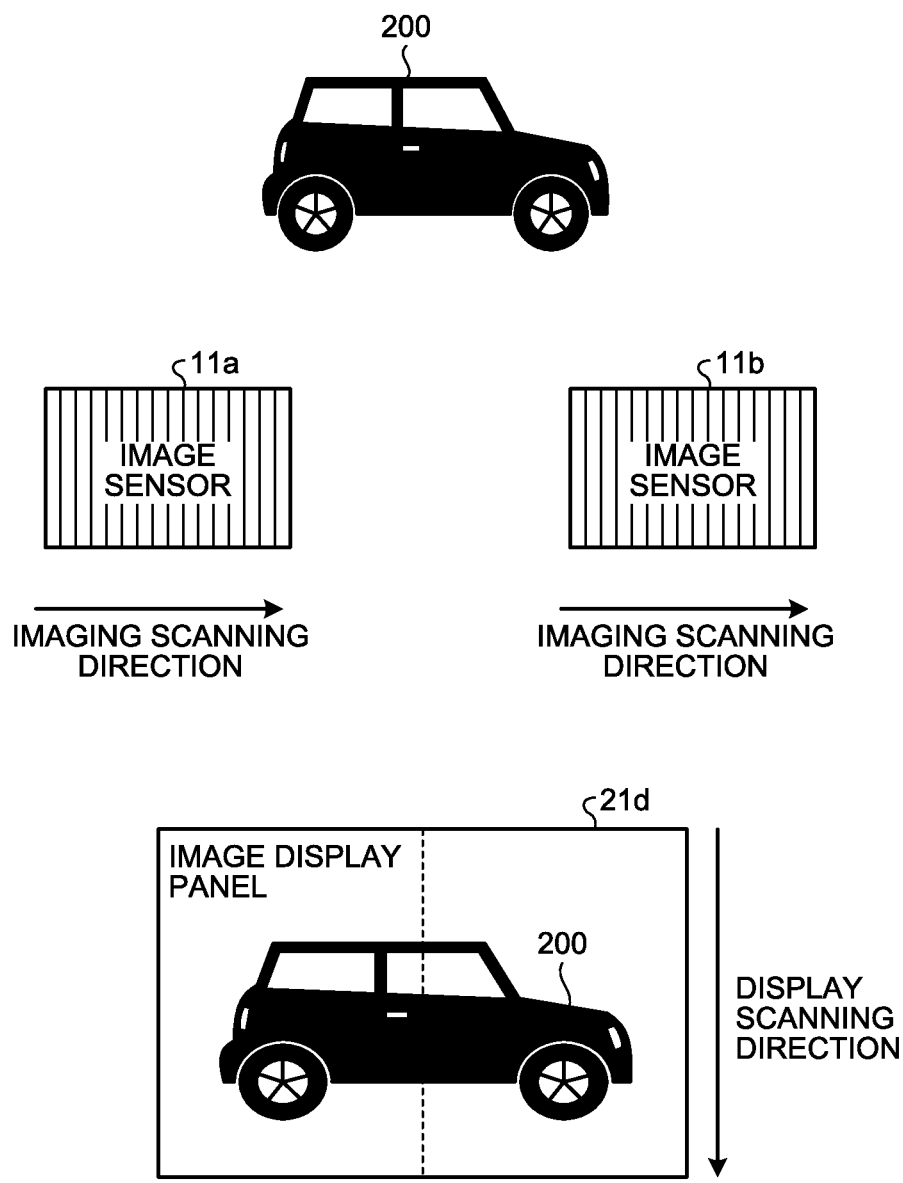
FIG. 32 is a diagram of an example of a display image displayed by the imaging display system according to the seventh embodiment.

FIG. 32 is a diagram of an example of a display image displayed by the imaging display system according to the seventh embodiment. The imaging scanning direction of the image sensors 11a and 11b according to the present embodiment is the horizontal direction, whereas the display scanning direction of the image display panel 21d is the vertical direction. The following describes a method of horizontal-vertical conversion in the scanning direction according to the present embodiment.

The image data taken by the imaging devices 10a and 10b and stored in the respective buffer memories 33d and 33e according to the present embodiment is output to an image processor 31b in order from the upper end data to the lower end data to be displayed on the image display panel 21d.

The synchronization signal generator 32g generates and outputs synchronization signals to the imaging device 10a, the imaging device 10b, the buffer memory 33d, the buffer memory 33e, and the display device 20d so as to display an image in which an image taken by the imaging device 10a and an image taken by the imaging device 10b are successively displayed in order of the imaging scanning direction of the image sensors 11a and 11b illustrated in FIG. 32. With this configuration, the image taken by the imaging device 10a and the image taken by the imaging device 10b are sequentially synthesized from the upper end of the image display panel 21d to form one image. The synthesized image is displayed on the image display panel 21.

Figure 33:
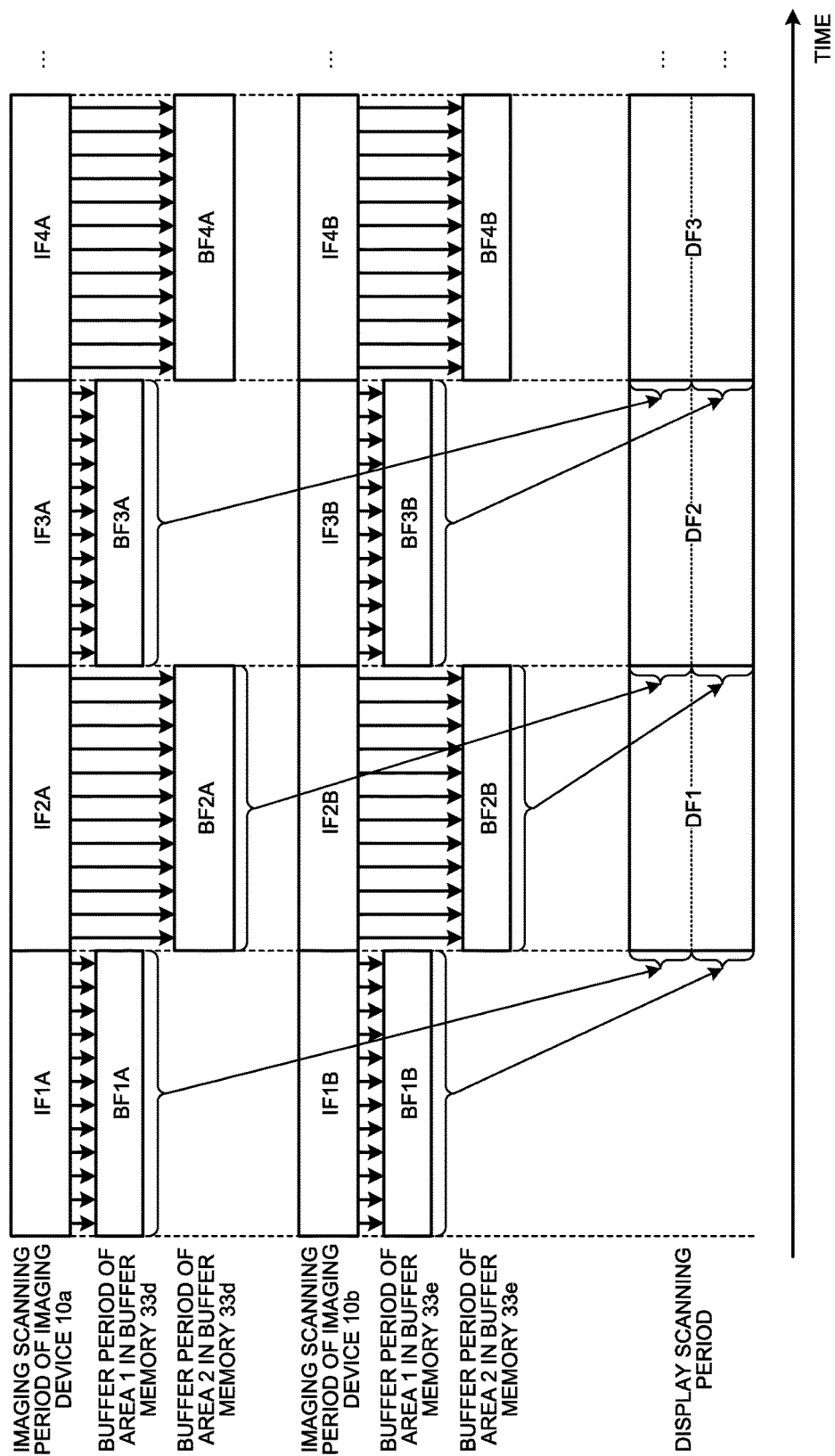
FIG. 33 is a diagram illustrating an example of a timing chart of the imaging scanning periods and the display scanning periods of the imaging display system according to the seventh embodiment.

FIG. 33 is a diagram illustrating an example of a timing chart of the imaging scanning periods and the display scanning periods of the imaging display system 1g according to the seventh embodiment. FIG. 33 schematically illustrates an example of the relation between the imaging scanning periods IF1A, IF2A, . . . of the imaging device 10a, the imaging scanning periods IF1B, IF2B, . . . of the imaging device 10b, the buffer periods BF1A, BF2A, . . . for storing image data output from the imaging device 10a in the buffer memory 33d, the buffer periods BF1B, BF2B, . . . for storing image data output from the imaging device 10b in the buffer memory 33e, and the display scanning periods DF1, DF2, . . . of the display device 20d. FIG. 33 illustrates no image processing time of the image processor 31b or the like in the processing device 30g.

Image data taken by the imaging device 10a in the imaging scanning period IF1A is stored in the area 1 of the buffer memory 33d. Image data taken by the imaging device 10b in the imaging scanning period IF1B is stored in the area 1 of the buffer memory 33e.

The image data stored in the respective areas 1 of the buffer memories 33d and 33e are subjected to horizontal-vertical conversion and then output in the subsequent imaging scanning periods IF2A and IF2B of the imaging devices 10a and 10b, respectively. As a result, the display scanning period DF1 is formed. Simultaneously with this processing, image data taken by the imaging device 10a in the imaging scanning period IF2A is stored in the area 2 of the buffer memory 33d, and image data taken by the imaging device 10b in the imaging scanning period IF2B is stored in the area 2 of the buffer memory 33e.

The image data stored in the respective areas 2 of the buffer memories 33d and 33e are subjected to horizontal-vertical conversion and then output in the subsequent imaging scanning periods IF3A and IF3B of the imaging devices 10a and 10b, respectively. As a result, the display scanning period DF2 is formed. Simultaneously with this processing, image data taken by the imaging devices 10a and 10b are stored in the areas 1 of the buffer memories 33d and 33e, respectively.

By repeating the processing described above, the image taken by the image sensor 11a and the image taken by the image sensor 11b are synthesized, and the synthesized image is displayed on the image display panel 21d.

While the buffer memories 33d and 33e according to the present embodiment each require memory capacity of two frames, the present embodiment can perform horizontal-vertical conversion on the image data in a delay time of one frame. The present embodiment need not cause the scanning direction of the imaging devices to coincide with that of the display device. With this configuration, for example, the present embodiment can cause the display scanning direction to coincide with the vertical direction like in usual configurations and cause the imaging scanning direction of the imaging devices 10a and 10b to coincide with the horizontal direction to eliminate or reduce distortion of a moving object in an oblique direction. Consequently, the present embodiment can increase the flexibility in selection of the display device.

As described above, the imaging display system 1g according to the seventh embodiment includes the buffer memories 33d and 33e. The buffer memory 33d can store therein images of two frames taken by the imaging device 10a. The buffer memory 33e can store therein images of two frames taken by the imaging device 10b. The imaging display system 1g performs horizontal-vertical conversion on the image data stored in the buffer memories 33d and 33e and then outputs the image data. Consequently, the imaging display system 1g need not cause the scanning direction of the imaging devices to coincide with that of the display device, thereby increasing the flexibility in selection of the display device.

Figure 34A:
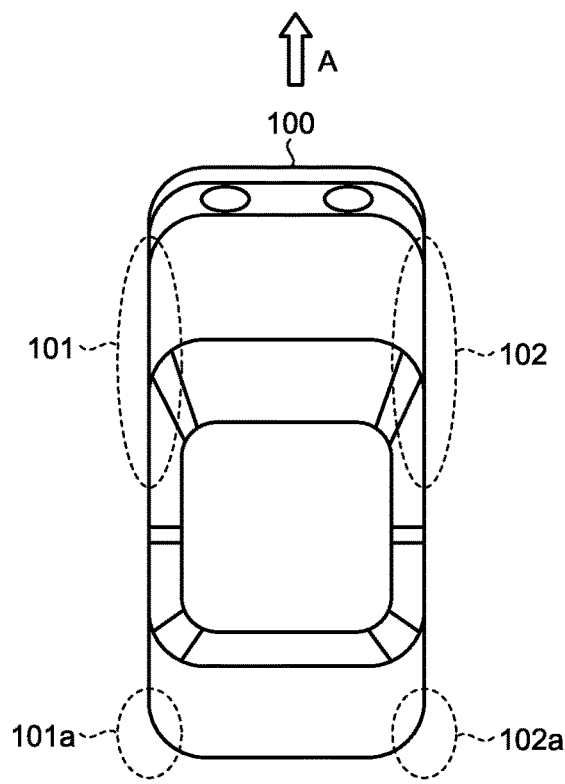
FIGS. 34A and 34B are diagrams each illustrating an application example of the imaging display systems according to the first to the seventh embodiments.
Figure 34B:
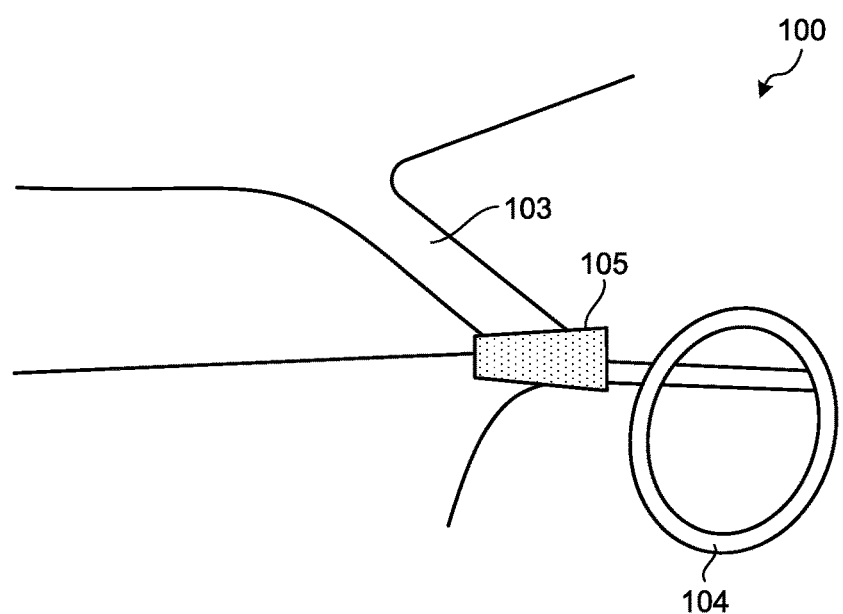

FIGS. 34A and 34B are diagrams each illustrating an application example of the imaging display systems according to the first to the seventh embodiments. FIG. 34A is a diagram of the car 100 serving as a movable body viewed from above defining the arrow A direction as the moving direction (traveling direction) of the car 100, for example. FIG. 34B is a diagram of the inside of the car 100 viewed from a driver who sits on a seat to operate a steering wheel 104.

The imaging devices 10, 10a, 10b, and 10c according to the embodiments above are arranged at a left side surface 101 and a right side surface 102 or a left side surface rear portion 101a and a right side surface rear portion 102a of the car 100 serving as a movable body. The display devices 20, 20a, 20b, 20c, and 20d according to the embodiments above are arranged at the center console described above or a side-view mirror visual check position 105 as illustrated in FIG. 34B. The side-view mirror visual check position 105 is positioned in a driver's gaze direction in which the driver usually visually checks a side-view mirror over a pillar 103.

When the imaging devices 10, 10a, 10b, and 10c and the display devices 20, 20a, 20b, 20c, and 20d according to the embodiments above are arranged in this manner, the imaging display systems according to the first to the seventh embodiments can provide a digital mirror function instead of typical side-view mirrors.

The imaging scanning direction of the image sensors 11, 11a, 11b, and 11c of the imaging devices 10, 10a, 10b, and 10c according to the first to the seventh embodiments is the horizontal direction. In the digital mirror using the imaging display systems according to the first to the seventh embodiments, the imaging scanning direction of the image sensors 11, 11a, 11b, and 11c coincides with the traveling direction (moving direction) of the car 100 in the example illustrated in FIGS. 34A and 34B. With this configuration, the first to the seventh embodiments can eliminate or reduce moving body distortion in an oblique direction in the image displayed on the display devices 20, 20a, 20b, 20c, and 20d. Consequently, the first to the seventh embodiments can eliminate or reduce erroneous recognition of a visible distance caused by moving body distortion in the image.

While exemplary embodiments have been described, the configurations according to the embodiments above may be combined, and the contents described above are not intended to limit the present invention. The components according to the present invention include components easily conceivable by those skilled in the art, components substantially identical therewith, and equivalents. The components described above may be appropriately combined. Various omissions, substitutions, and changes of the components may be made without departing from the spirit of the present invention.

What is claimed is:

1. An imaging display system comprising:
    a plurality of imaging devices each of which includes a rolling shutter image sensor that takes an image;
    a display device that displays the image; and
    a processor that is configured to perform image processing on the image, the imaging display system being mounted on a movable body that moves in a certain direction on a reference plane,
    wherein each imaging device is arranged at an angle with respect to a moving direction of the movable body on the reference plane,
    wherein an imaging scanning direction of the image on the image sensor of each imaging device is horizontal with respect to the reference plane, and a display scanning direction of the image displayed on the display device coincides with the imaging scanning direction,
    wherein the plurality of imaging devices comprises two imaging devices arranged at symmetrical positions with respect to the moving direction of the movable body,
    wherein the display device displays two images taken by the two imaging devices in a manner arranged in a line, and
    wherein directions of components parallel to the moving direction of the movable body in the imaging scanning directions of the respective images on the image sensors of the two imaging devices are opposite to each other.

2. The imaging display system according to claim 1,
    wherein the plurality of imaging devices comprises imaging devices having a same angle of view and arranged in the moving direction of the movable body so as to form a single image with angles of view of the respective imaging devices, and
    wherein the display device displays the single image obtained by synthesizing a plurality of images in a manner arranged in the moving direction of the movable body, the images being taken by the imaging devices having the same angle of view.

3. The imaging display system according to claim 2,
wherein the imaging devices having the same angle of view take the images partially overlapping in the moving direction of the movable body with the respective angles of view, and
wherein the images taken by the imaging devices having the same angle of view include a first image and a second image, and the display device switches from displaying the first image to displaying the second image at a timing in a period in which the overlapped images of the first and second images are taken by the imaging devices having the same angle of view.

4. The imaging display system according to claim 2,
wherein the processor comprises a plurality of buffer memories, the number of which corresponds to the number of the imaging devices having the same angle of view,
wherein each of the buffer memories stores therein an image of one frame taken by a corresponding one of the imaging devices having the same angle of view, and
wherein the display device displays the single image using a plurality of images read from the buffer memories.

5. The imaging display system according to claim 4,
wherein the buffer memories enable simultaneous writing and reading of data.

6. The imaging display system according to claim 4,
wherein the display device displays the images that are successively taken by the imaging devices having the same angle of view in respective imaging scanning periods in one frame period.

7. The imaging display system according to claim 1,
wherein the display device displays the two images in a manner arranged in time series.

8. The imaging display system according to claim 1,
wherein the display device displays the two images in a manner arranged in a line simultaneously.

9. The imaging display system according to claim 1, further comprising:
an image generator that generates an insertion image to be displayed with the two images such that the insertion image and the two images are arranged in a line.

10. The imaging display system according to claim 9,
wherein the display device displays the insertion image between the two images.

11. The imaging display system according to claim 2,
wherein at least one of the two imaging devices is identical to at least one of the imaging devices having the same angle of view.

12. The imaging display system according to claim 3,
wherein at least one of the two imaging devices is identical to at least one of the imaging devices having the same angle of view.

13. The imaging display system according to claim 4,
wherein at least one of the two imaging devices is identical to at least one of the imaging devices having the same angle of view.

14. The imaging display system according to claim 13,
wherein the buffer memories enable simultaneous writing and reading of data.

15. The imaging display system according to claim 13,
wherein the display device displays the images that are successively taken by the imaging devices having the same angle of view in respective imaging scanning periods in one frame period.

* * * * *